(12) United States Patent
Hong et al.

(10) Patent No.: US 7,810,932 B2
(45) Date of Patent: Oct. 12, 2010

(54) DISPLAY DEVICE AND METHOD THEREOF

(75) Inventors: Sam Nyol Hong, Seoul (KR); Gi Tak Yun, Seoul (KR); Hee Sool Koo, Gyeonggi-do (KR); Sang Hoon Hahn, Seoul (KR); In Ho Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1238 days.

(21) Appl. No.: 11/376,140

(22) Filed: Mar. 16, 2006

(65) Prior Publication Data

US 2006/0290824 A1   Dec. 28, 2006

(30) Foreign Application Priority Data

Mar. 18, 2005   (KR) ...................... 10-2005-0022850

(51) Int. Cl.
*G03B 21/14* (2006.01)
*G03B 21/26* (2006.01)

(52) U.S. Cl. .................... 353/46; 359/197.1; 359/209.1; 359/221.2; 353/121

(58) Field of Classification Search ................... 353/30, 353/46, 50, 98, 121, 122; 359/197.1, 198.1, 359/199.3, 209.1, 221.2, 223.1; 362/231
See application file for complete search history.

(56) References Cited

U.S. PATENT DOCUMENTS

| | | | | |
|---|---|---|---|---|
| 5,402,184 A * | 3/1995 | O'Grady et al. ............. 348/764 |
| 6,219,110 B1 * | 4/2001 | Ishikawa et al. ............ 348/759 |
| 6,547,398 B2 * | 4/2003 | Cho et al. ...................... 353/31 |
| 7,046,407 B2 * | 5/2006 | Conner ......................... 359/15 |
| 7,270,417 B2 * | 9/2007 | Choi et al. ..................... 353/34 |
| 7,290,884 B2 * | 11/2007 | Choi et al. ..................... 353/34 |
| 7,425,074 B2 * | 9/2008 | Kang et al. .................... 353/46 |
| 2005/0128438 A1 * | 6/2005 | Kang et al. .................... 353/69 |
| 2005/0128443 A1 * | 6/2005 | Kang et al. ................. 353/122 |
| 2005/0225732 A1 * | 10/2005 | Conner et al. ................. 353/31 |
| 2005/0243290 A1 * | 11/2005 | Gupta .......................... 353/99 |
| 2005/0264501 A1 * | 12/2005 | Choi et al. ..................... 345/84 |
| 2006/0007057 A1 * | 1/2006 | Choi et al. ..................... 345/9 |
| 2006/0033887 A1 * | 2/2006 | Wang .......................... 353/46 |

* cited by examiner

*Primary Examiner*—William C Dowling
(74) *Attorney, Agent, or Firm*—Birch, Stewart, Kolasch & Birch, LLP

(57) ABSTRACT

Disclosed is a display device adapting a resolution improvement device capable of effectively improving a resolution in a projecting display device and a method thereof. A display device according to the present invention comprises: a light source; an image forming means for forming an image using a light emitted from the light source and an input image signal; a projection means for projecting an image formed in the image forming means on a screen; a displacement means for displacing an image displayed on the screen to be displaced; a driving means for driving the displacement to be moved; and an input signal applying means for applying an input signal to the driving means for the displacement means to be rotated in a predetermined direction.

According to the present invention, different images are displayed on a screen periodically. It seems that the greater number of pixels is used than the real number in a sense of sight. Thus, the present invention has an effect of improving a resolution with the same number of pixels.

23 Claims, 28 Drawing Sheets

(a)

Odd Data
Image (b)

Even Data
Image

DISPLAY DEVICE AND METHOD THEREOF

BACKGROUND OF THE INVENTION

1. Field of the Invention

The present invention relates to a display device and a method thereof, more particularly, to a display device adapting a resolution improvement device capable of effectively improving a resolution in a projection-type display device and a method thereof.

2. Background of the Related Art

In a recent trend, as a display device becomes lighter, thinner and larger screened, a large screened display device draws a concentration in a displaying field.

Especially, a projection-type image display device is required to have a higher resolution in accordance with a popularization of a digital broadcasting.

SUMMARY OF THE INVENTION

In accordance with the above requests, an object of the present invention is to provide with a displaying device capable of effectively improving a resolution with a simple configuration and an operation, and a method thereof.

In order to achieve the objects, a display device in accordance with the present invention comprises: a light source; an image forming means for forming an image using a light emitted from the light source and an input image signal; a projecting means for projecting an image formed in the image forming means on a screen; a displacement means for displacing an image displayed on the screen to be displaced; a driving means for driving the displacement to be moved; and an input signal applying means for applying an input signal to the driving means for the displacement means to be rotated in a predetermined direction.

In the present invention, preferably, the image forming means divides an image signal corresponding to one frame into more than two image signals.

In the present invention, preferably, the displacement means is a displacement plate with a central axis, rotating in a range of a predetermined angle.

In the present invention, preferably, the displacement plate rotates around the central axis clockwise and counterclockwise.

In the present invention, preferably, the rotating range is between −0.75 and 0.75.

In the present invention, preferably, a refractive index of the displacement plate is in a range of 1.4~2.0.

In the present invention, preferably, the displacement means forms more than two displacements while a screen of one frame is transmitted.

In the present invention, preferably, the driving means drives the displacement means by an interaction of a magnet and a coil.

In the present invention, preferably, the magnet is a two-pole magnet with an N-pole and an S-pole.

In the present invention, preferably, the magnet is an one-pole magnet with a selectively chosen N-pole or S-pole.

In the present invention, preferably, the input signal applying means is driven by repeating a process that the displacement means rotates in the first direction to be stopped and a process that the displacement means rotates in the second direction to be stopped.

In the present invention, preferably, the input signal comprises: a second-directional sub-input for rotating the displacement means in the first direction and providing a rotating force in the second direction to stop it, a first-directional main input for providing a rotating force in the first direction, a second-directional main input for providing a rotating force in the second direction and a first-directional sub-input for providing a rotating force in the first direction.

In the present invention, preferably, the input signal comprises: a first-directional sub-input for rotating the displacement means in the second direction and providing a rotating force in the first direction to stop it, a second-directional main input for providing a rotating force in the second direction, a first-directional main input for providing a rotating force in the first direction and a second-directional sub-input for providing a rotating force in the second direction.

In the present invention, preferably, the first-directional sub-input and the second directional sub-input are provided with a rotating force with less than 40% of the first-directional main input and the second-directional main input.

In the present invention, preferably, the input-signal applying means has a driving waveform including an interval where the displacement means rotates in the first direction, an interval where the displacement means rotating in the first direction is stabilized to be stopped, an interval where the displacement means rotates in the second direction, and an interval where the displacement means rotating in the second direction is stabilized to be stopped.

In the present invention, preferably, the input signal has a digital value generated by a digital board, which is applied in an analog type through a digital-analog transformer.

In the present invention, preferably, the digital board generates 256 digital values during a half cycle where the displacement means is driven.

In the present invention, preferably, the input signal applying means applies an input signal so that the displacement means rotate, satisfying an optimized driving waveform.

In the present invention, preferably, the driving waveform and the input waveform do not cause a time delay.

In the present invention, preferably, a rising time of the driving waveform is in a range of 0.5~1.2 ms.

In the present invention, preferably, an overshoot of the driving waveform is in a range of 10~40%.

A display method according to the present invention comprises: inputting an image signal having a plurality of frames; separating an image signal in one frame input sequentially into a plurality of image signals; sequentially inputting the separated plurality of image signals to form an image signal; applying an input signal to an image displacement means so that the plurality of sequentially formed images is displaced at a different position of a screen; and having an interval where the image displacement means rotates in the first direction in accordance with the input signal, an interval where the image displacement means rotated in the first direction is stabilized to be stopped, an interval where the image displacement means rotates in the second direction and an interval where the image displacement means rotated in the second direction is stabilized to be stopped in order to drive the image displacement means to rotate; and projecting an image having the image displacement means.

In the present invention, the input signal comprises: a second-directional sub-input for rotating the image displacement means in a first direction and providing a rotating force in the second direction to stop it, a first-directional main input for providing a rotating force in the first direction, a second-directional main input for providing a rotating force in a second-direction and a first-directional sub-input for providing a rotating force in the first direction.

In the present invention, the input signal comprises: a first-directional sub-input for rotating the image displacement means in the second direction and providing a rotating force in the first direction to stop it, a second-directional main input for providing a rotating force in the second direction, a first-directional main input for providing a rotating force in the first direction and a second-directional sub-input for providing a rotating force in the second direction.

In the present invention, preferably, the input signal has a digital value generated by a digital board.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

The present invention now will be described in detail with reference to the following embodiments hereinafter. Since numerous modifications and variations will readily occur to those skilled in the art, it is not desired to limit the invention to the exact construction and operation illustrated and described, and accordingly, all suitable modifications and equivalents may be resorted to within the spirit and scope of the invention.

The present invention discloses a display device adapting a resolution improvement device. In general, a resolution refers to the number of pixels used to represent an image. In other words, a resolution is referred to as a standard to show the preciseness in representing an image.

A physical method is used to increase the number of pixels in order to improve a resolution in a conventional display device, while a method to improve a resolution using a human visual characteristics in the present invention.

In other words, the present invention can represent an image with much more improved resolution quality than a real physical resolution quality, resulting in showing the effects that a resolution of present invention is physically improved.

As will be described in the description in detail, the present invention divides an image signal corresponding to one frame into the first image signal and the second image signal to form the first image and the second image, respectively displayed at the first position and the second position of a screen. It feels like a resolution is improved in accordance with the human visual characteristics.

For example, the first position and the second position have an interval less than or more than one pixel, and can be separated in a vertical, a horizontal and a diagonal direction.

Especially, an optical pathway changing means is used in order to displace positions of the first image and the second image displayed by the first position and the second position in the present invention.

The optical pathway changing means uses a light-transmitting body and an optical pathway is changed by changes of a location and an angle of the light-transmitting body.

Figure 1:
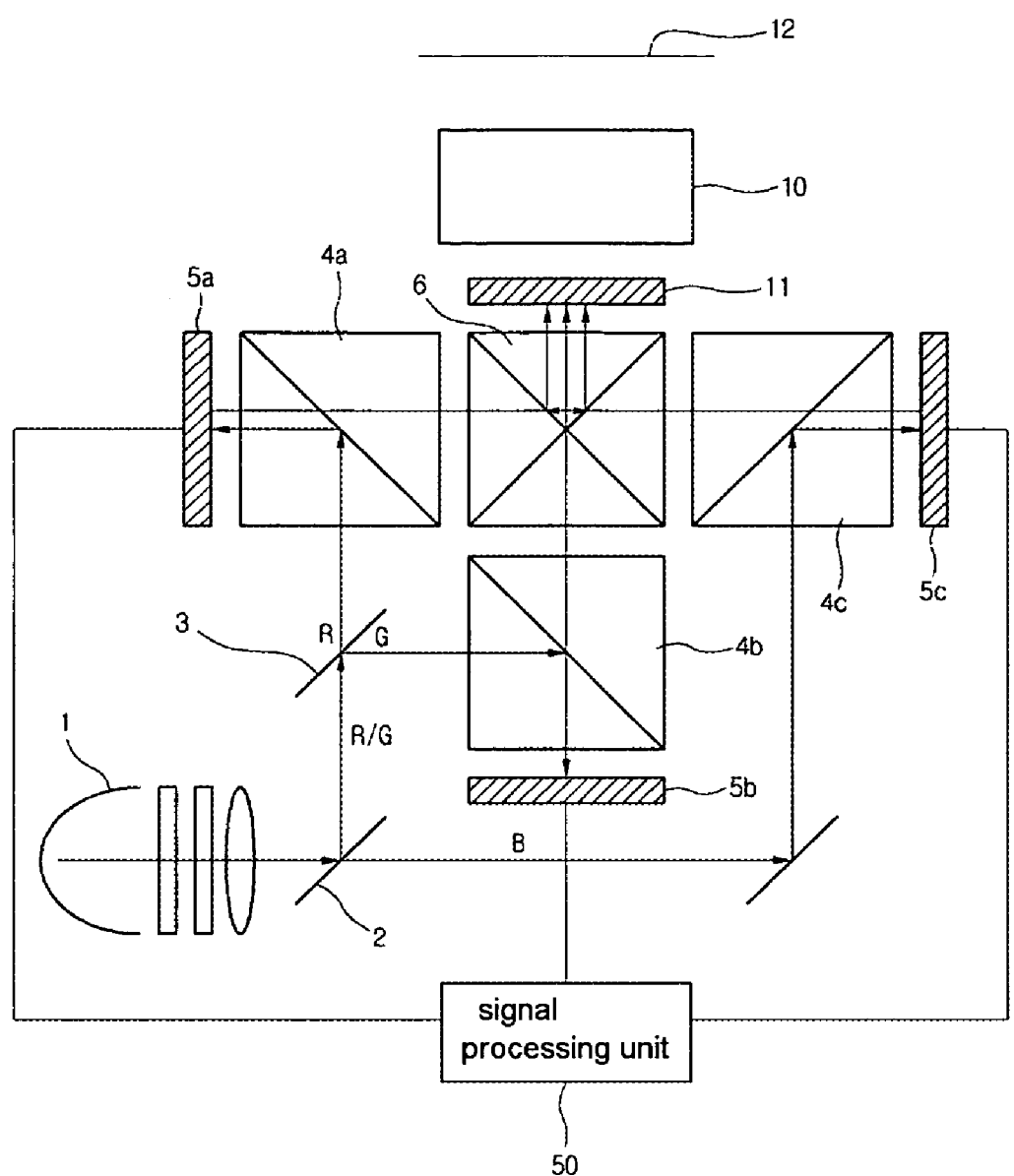
FIG. 1 shows an embodiment of a display device adapting a resolution improvement device in accordance with the present invention and a method thereof.

FIG. 1 is an embodiment illustrating a display device adapting a resolution improvement device in accordance with the present invention and a method thereof.

FIG. 1 is one of illuminators of a projection TV using a reflective LCD. The reflective illuminator of 3 PBS systems in FIG. 1 reflects a green G light and transmits a blue B light while a light irradiated from the lamp 1 passes by a condensing lens through the first dichroic mirror 2.

The reflected red and green lights pass by the second dichroic mirror 3 to reflect a green light and to transmit a red light, while the red, green and blue lights are impinged to the first, second and third PBS (Polarized Beam splitter) 4a, 4b and 4c in front of the first, second and third LCD panels 5a, 5b and 5c.

The R, G, B lights impinged on the first, second and third PBS 4a, 4b and 4c are reflected on the first, second and third LCD panels 5a, 5b and 5c, while the phases of the impinged R, G, and B lights are changed to be reflected by the first, second and third LCD panels 5a, 5b and 5c to transmit the first, second and third PBS 4a, 4b and 4c.

The first, second and third LCD panels 5a, 5b and 5c form an image in accordance with an image signal input from the signal processing unit 50.

The R, G and B images transmitted through the first, second and third LCD panels 5a, 5b and 5c and the first, second and third PBS 4a, 4b and 4c are composed at an X-prism 6 to be impinged on a projection lens 10 through a displacement plate 11.

In addition, an image is projected on a screen 12 through the projection lens 10.

At this time, the displacement plate 11 can be positioned between the X-prism 6 and the projection lens 10 or between the projection lens 10 and the screen 12.

The displacement plate 11 is a thin plate-type light-transmitting body to which a light is transmitted, and its position or an angle is changed to realize a higher resolution.

Moreover, an optical system using a reflective LCD, a dichroic mirror and PBS are illustrated in an embodiment of FIG. 1, but a backlit LCD can be used instead of a reflective LCD. The reflective LCD may use an LCOS (Liquid Crystal on Silicon).

In addition, the example illustrated in FIG. 1 can be used in a three-panel type with three LCD panels or a single-panel type with one LCD panel, but the structure of an optic system can be variously modified.

Further, the present invention can be applied not only to a projection TV but also to a projector.

In other words, the forgoing embodiments are merely exemplary and are not to be construed as limiting the present invention. The description of the present invention is intended to be illustrative, and not to limit the scope of the present invention.

Figure 2:
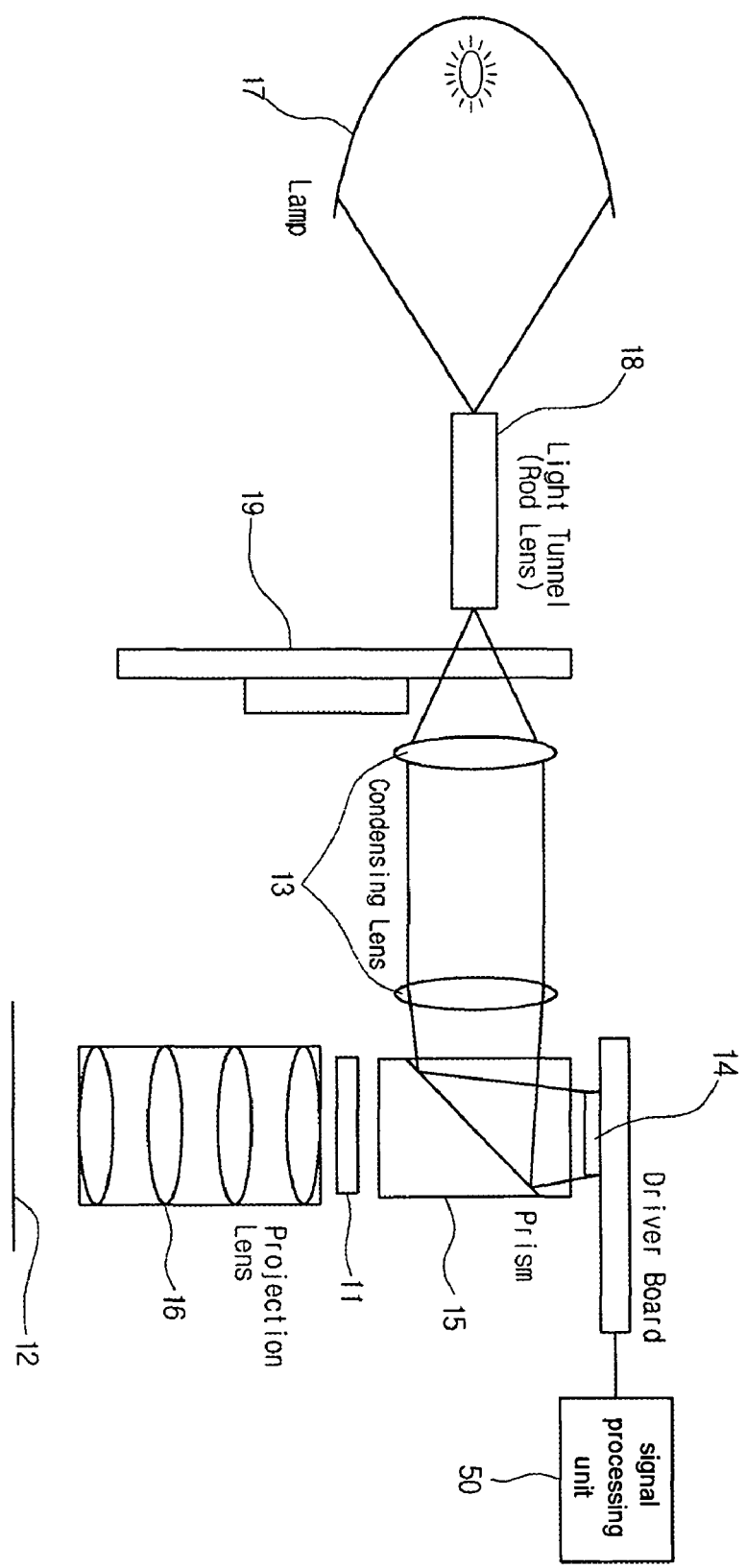
FIG. 2 shows another embodiment of a display device adapting a resolution improvement device in accordance with the present invention and a method thereof.

FIG. 2 is another embodiment illustrating a display device adopting a resolution improvement device of the present invention and a method thereof.

FIG. 2 is a DLP optical system adopting the present invention.

The optical system provides with a light to be shed on the DMD 14 and it is decided if each micromirror sheds onward a screen at a state of "on" or sheds on the other side of the screen at a state of "off".

The DLP optical system includes: a lamp 17 generating a light, a rod lens 18 through which a light generated from the lamp 17 is transmitted, a color wheel 19 where a white light transmitted through the rod lens 18 is divided into R, G and B, a condensing lens 13 for collecting lights passing by the color wheel 19, a prism 15 where a light passing by the condensing lens 13 is reflected, a DMD 14 shedding a light reflected on the prism 15 onto a screen, a displacement plate 11 for displacing a light reflected from the DMD 14 to be displaced in accordance with changes of time and a projection lens 16 for enlarging a light passing by the displacement plate 11 to be projected on the screen 12.

When it comes to an operation of a DLP Optical system based on the above configuration, a white light emitted from the lamp 17 is focused by an internal curvature of a reflector, and the focused light passes by a light tunnel or a rod lens 18.

The rod lens 18 is formed by adhering four small and long mirrors facing one another and a light passing by the rod lens 18 is diffusely reflected to uniform a brightness distribution.

To make the brightness of a light uniform is to make the brightness of a light shed on a screen uniform finally, and the rod lens 18 with this function becomes important optical parts in a projection-type display device.

The light transmitted through the rod lens 18 passes by a color wheel 19 for a color division and the color wheel 19 rotates in accordance with a vertical sync of an image.

A light passing by the color wheel 19 is reflected on the prism 15 through the condensing lens 13 toward the DMD 14.

The prism 15 can be totally reflected or transmitted in accordance with an incidence angle of a light.

The light reflected on the DMD 14 goes toward or beyond a screen in accordance with an "on" or "off" state of a micromirror.

The DMD 14 is changed into an "on" or "off" state in accordance with an image signal input in the signal processing unit 50 and a predetermined image is formed thereby.

An image reflected on the DMD 14 to go toward the screen 12 passes by a displacement plate 11 and a projection lens 16 to be enlarged to shed a light on a large screen 12.

At this time, the displacement plate 11 can be located between the prism 15 and the projection lens 16 or between the screen 12 and the projection lens 16, or between the DMD 14 and the prism 15, in addition.

Moreover, the displacement plate 11 changes its positions or an angle periodically to shed a projection light on the other positions of the screen 12.

In accordance with the embodiments illustrated in FIGS. 1 and 2, the displacement plate 11 can be located at a selected point between an image forming means for forming an image by composing R, G and B, and a screen.

In the meantime, the image forming means in FIGS. 1 and 2 divides an image signal corresponding to one frame into the first image signal and the second image signal, respectively, from the signal processing unit 50 to form the first image and the second image by composing R, G and B.

More concretely, an image forming means in FIG. 1 may include the first, second and third LCD panels 5a, 5b and 5c, the first, second and third PBS 4a, 4b and 4c and an X-prism 6.

In addition, the image forming means in FIG. 2 may include a color wheel 19, a condensing lens 13 and a DMD 14.

In other words, an image signal corresponding to one frame is divided into a plurality of image signals and composed into a plurality of images to be displayed in the present invention.

In addition, a time for displaying one image in the present invention is a time for displaying an image of a frame divided by the number of images.

In a preferred embodiment of the present invention, an image signal corresponding to one frame is divided into the first image signal and the second image signal and composed into the first image and the second image, which are sequentially displayed at the first position and the second position, thereby having an effect that a resolution is improved.

Figure 3:
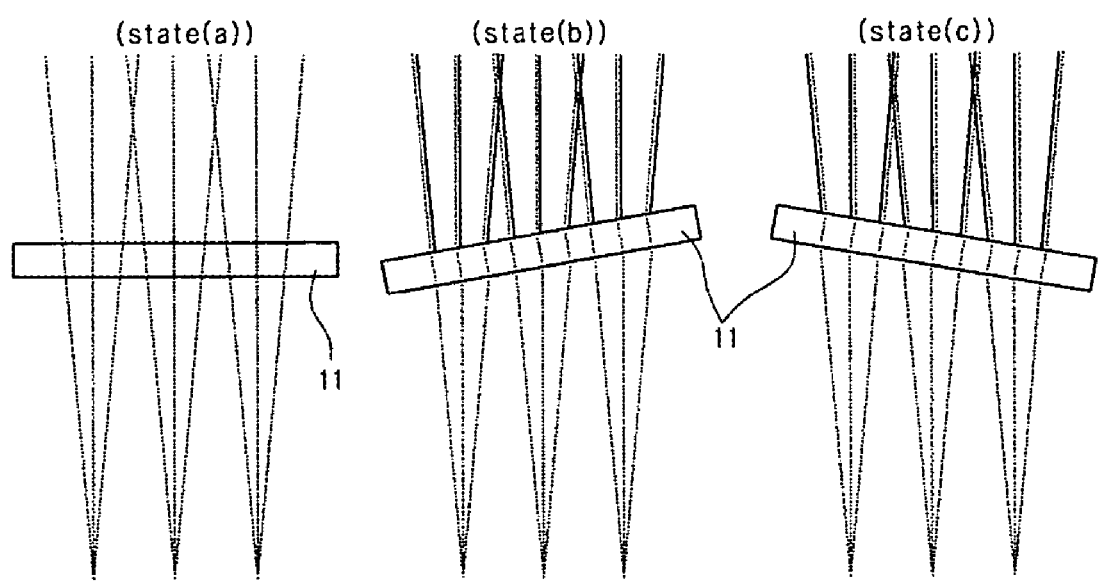
FIG. 3 is a view illustrating an operation of a displacement plate in a display device adapting a resolution improvement device in accordance with the present invention and a method thereof.

FIG. 3 is a view illustrating an operation of a displacement plate in a resolution improvement device of the present invention.

In FIG. 3, (a) shows that an image emitted form a prism or a projection lens is displayed in the same position at the states where the displacement plate 11 is not presented or the displacement plate 11 is not moved.

On the contrary, (b) shows that the displacement plate 11 rotates counterclockwise and (c) shows that the displacement plate 11 rotates clockwise.

If the displacement plate 11 at the state of (a) is changed into the states of (b) or (c), an image is refracted on the different locations of the screen via the displacement plate 11.

In other words, the displacement plate 11 in the present invention is operated as an optical pathway changing means so that an image is displayed on a different location in accordance with the movements of the displacement plate 11 when the image is projected.

So to speak, the displacement plate 11 as an image displacement means is supposed to change the locations of an image displayed on a screen in the present invention.

Figure 4:
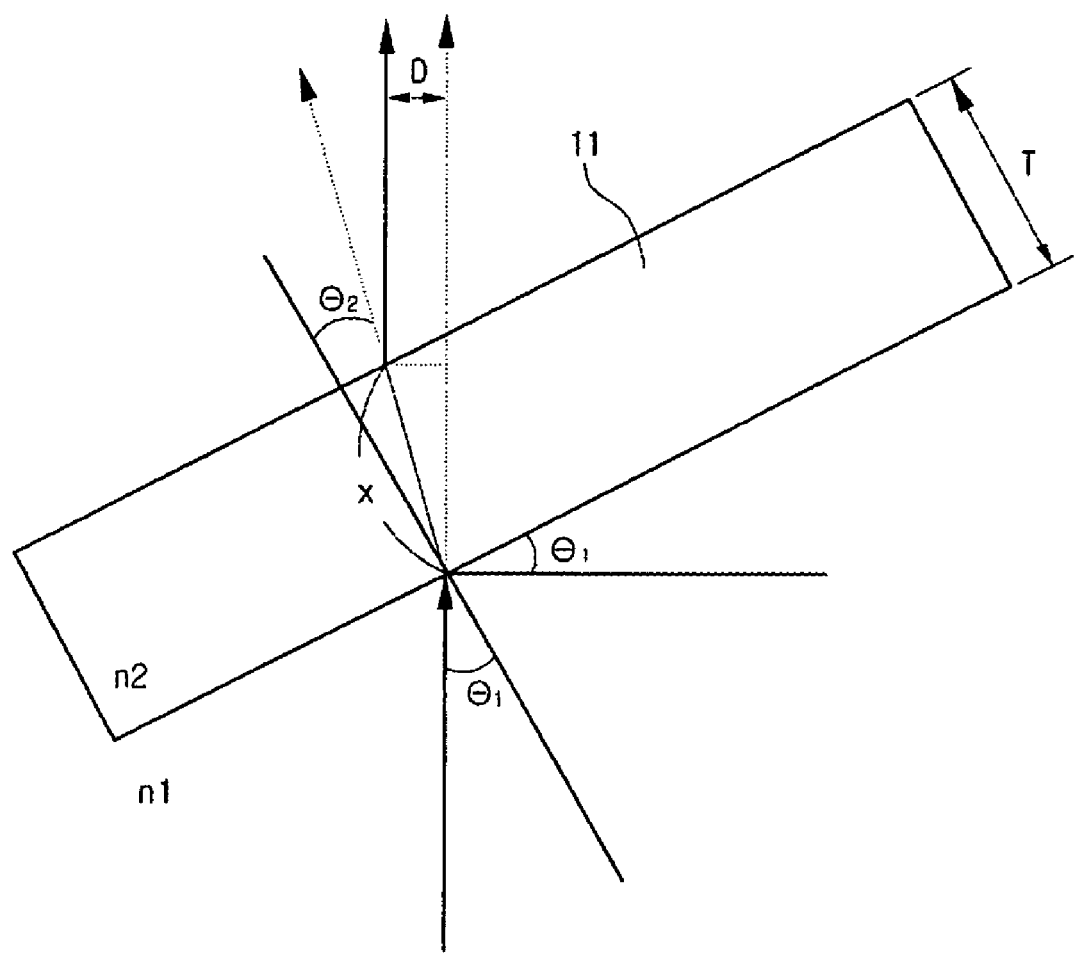
FIG. 4 is a view illustrating an operational principle of a displacement plate as an image displacement means in a display device adapting a resolution improvement device in accordance with the present invention and a method thereof.

FIG. 4 is a view illustrating an operational principle of a displacement plate as an image displacement means in a display device where a resolution improvement device in accordance with the present invention is applied and a method thereof.

The movements of a light can be measured on the screen 12 in accordance with a thickness of a displacement plate 11, a degree of inclination of the displacement plate 11 or an incidence angle of a light, and a refractive index of the displacement plate 11, and the thickness, the degree of inclination and the refractive index of the displacement plate 11 may be selected in accordance with movements of a light required on the screen 12.

This may be derived from the Snell's rule represented in the formula 1.

$$n_1 \sin\theta_1 = n_2 \sin\theta_2$$

($n_1$ is a refractive index of air, $n_2$ is a refractive index of a displacement plate, $\theta_1$ is an incidence angle of a light, and $\theta_2$ is an refractive angle of a light)

Therefore, a difference D in pathways of a light via the displacement plate 11 may be represented in the formula 2.

$$D = \frac{T}{\cos\theta_2}\sin(\theta_1 - \theta_2)$$

($\cos\theta_2 = T/x$, $\sin(\theta_1-\theta_2) = D/x$ and $\theta_2 = \sin^{-1}(n_1 \sin\theta_1)/n_2$))

Furthermore, a difference D in pathways of a light via the displacement plate 11 determines if a light shed on a screen is displaced in accordance with a proportion of a projection lens.

It is preferable that a refractive index of the displacement plate 11 is selected in a range of 1.4~2.0.

The present invention uses a light transmitting body to generate a difference D in pathways of a light, using a refraction phenomenon of a light.

In the meantime, according to another embodiment of the present invention, a reflective mirror may be used in order to change a pathway of a light.

In other words, a reflective mirror is positioned on an optical pathway, and a reflection angle of a light is changed to alter a pathway of a light reflected in accordance with an angle of the reflective mirror.

To change an optical pathway using a reflection requires for a more precise control than to change an optical pathway using a refraction, because a light pathway is sensitively changed in accordance with a change of angles of a reflective mirror.

In the present invention, an extent of a displacement of an image may be greater than or less than a size of a pixel. However, the extent of a displacement of an image can be ignored, therefore an optical pathway changing means should be operated precisely so that an image projected from the projection lens is displaced within a small extent.

Accordingly, an optical pathway changing means using a light transmitting body is advantageous in that a control is easily performed and a possibility of generating errors is greatly decreased.

Especially, as shown in FIG. 4, a light impinged at the same point of the light transmitting body generates a difference in pathways D, but does not change a progressive direction of a light.

In using a reflective mirror, even a light impinged at the same point of the reflective mirror requires for a more precise control, because a progressive direction of a light is changed in accordance with an angle of a reflective mirror.

Figure 5:
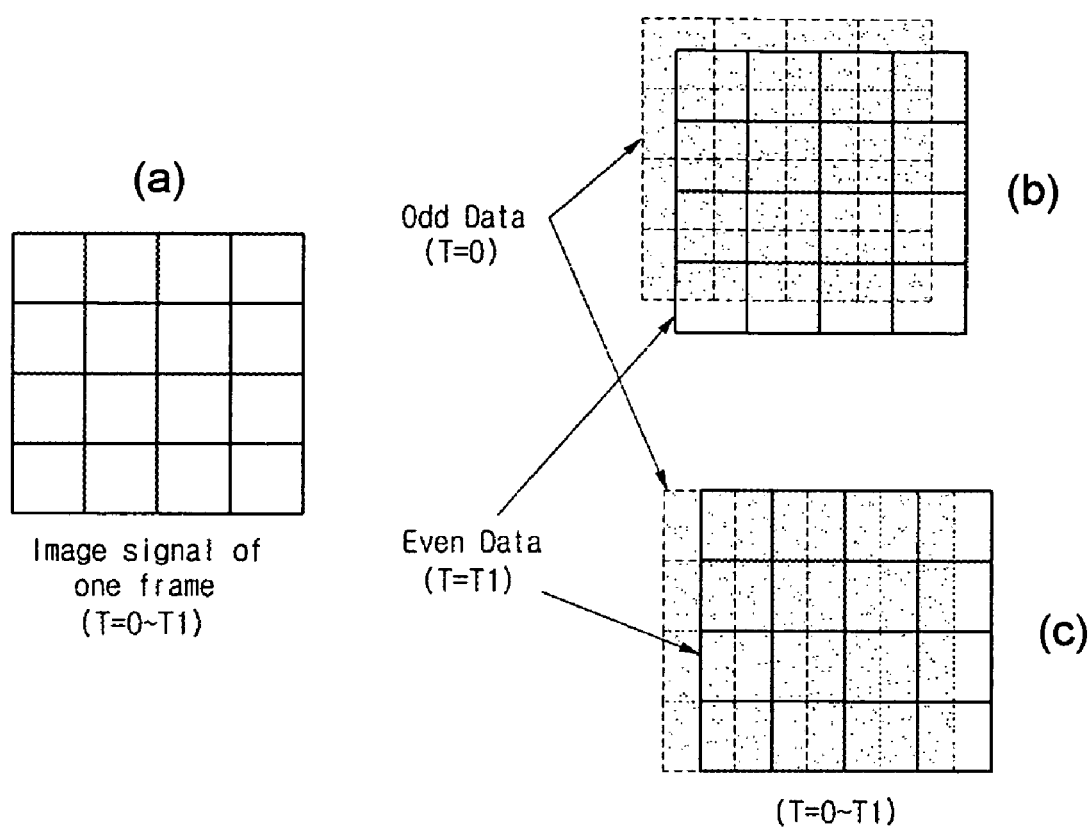
FIGS. 5 & 6 are views illustrating a displacement of a light shed on a screen in accordance with movements of the displacement plate in a display device adapting a resolution improvement device in accordance with the present invention and a method thereof.
Figure 6:
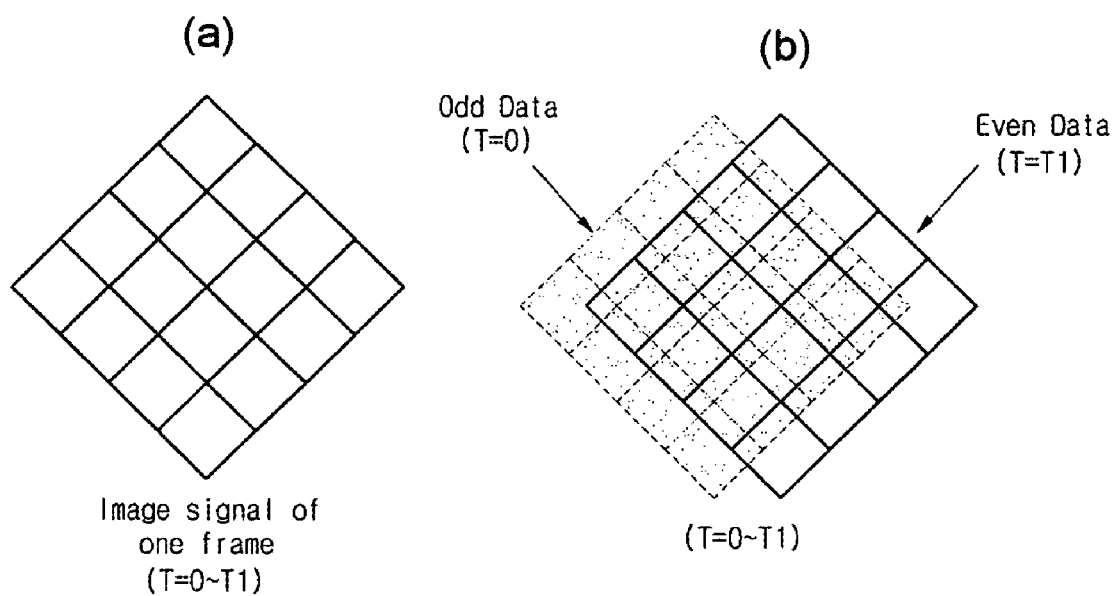

FIGS. 5 and 6 are views illustrating a displacement of a light shed on a screen in accordance with the movements of a displacement plate 11 in a display device where a resolution improvement device in accordance with the present invention is applied and a method thereof.

FIG. 5 shows that a displacement plate 11 periodically moves in a display device having a square pixel structure, and an image moves on a screen 12. In FIG. 5, (a) shows the same image at the same position during a predetermined time (T=0~T1) in a conventional pixel structure, but (b) and (c) show the different images at the different positions, respectively during the time (T=0) and (T=1). Therefore, is possible to make an image perceived like it has two times resolution with the same number of pixels.

For example, image signals consisting of one frame are divided into the first image signal and the second image signal, and an image of the first image signal and an image of the second image signal are composed to be sequentially displayed, when an image of one frame is displayed.

More concretely, if the same image information is displayed for 1/60 seconds in a conventional case, the image information is divided into the first image information and the second image information to be displayed at the first position and the second position, respectively for 1/120 seconds in the present invention.

Figure 7:
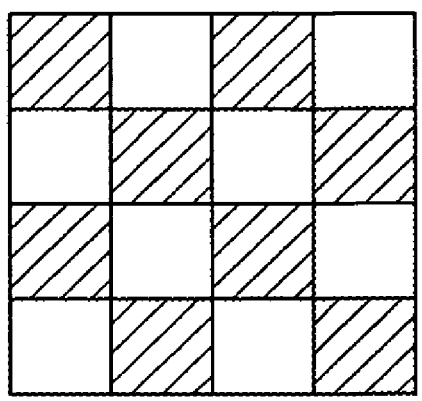
FIG. 7 is a view illustrating the first image and the second image in a display device adapting a resolution improvement device in accordance with the present invention.
Figure 7:
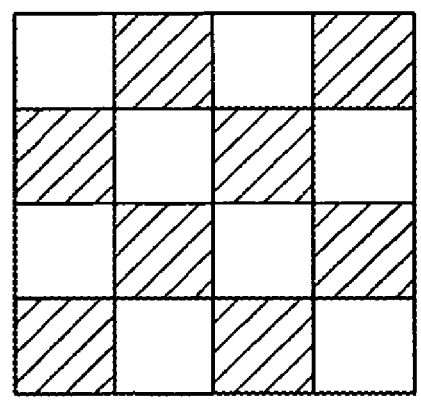

FIG. 7 illustrates that the first image and the second image into which one image corresponding to one frame is divided halves.

An image corresponding to one frame can be divided into the first image in FIG. 7(a) and the second image in FIG. 7(b), and the first image and the second image shown in FIG. 7 can be divided in accordance with the positions of a pixel.

In the meantime, the locations where the first image (Odd data) and the second image (Even data) are displayed are displaced.

FIG. 5(b) shows that a location where the first image (Odd data) is displayed is displaced with a location where the second image (Even data) is displayed in a diagonal direction, and FIG. 5(c) shows that a location where the first image (Odd data) is displayed is displaced with a location where the second image (Even data) is displayed in a horizontal direction.

FIG. 6 shows positions of an image with a rhombus pixel structure on a screen in a display device in accordance with time.

FIG. 6(a) shows the same image at the same position during a predetermined time (T=0~T1) in a conventional pixel structure, but (b) shows the different images at the different positions, respectively during the time (T=0) and (T=1). Therefore, it feels like an image has two times resolution with the same number of pixels.

Figure 8:
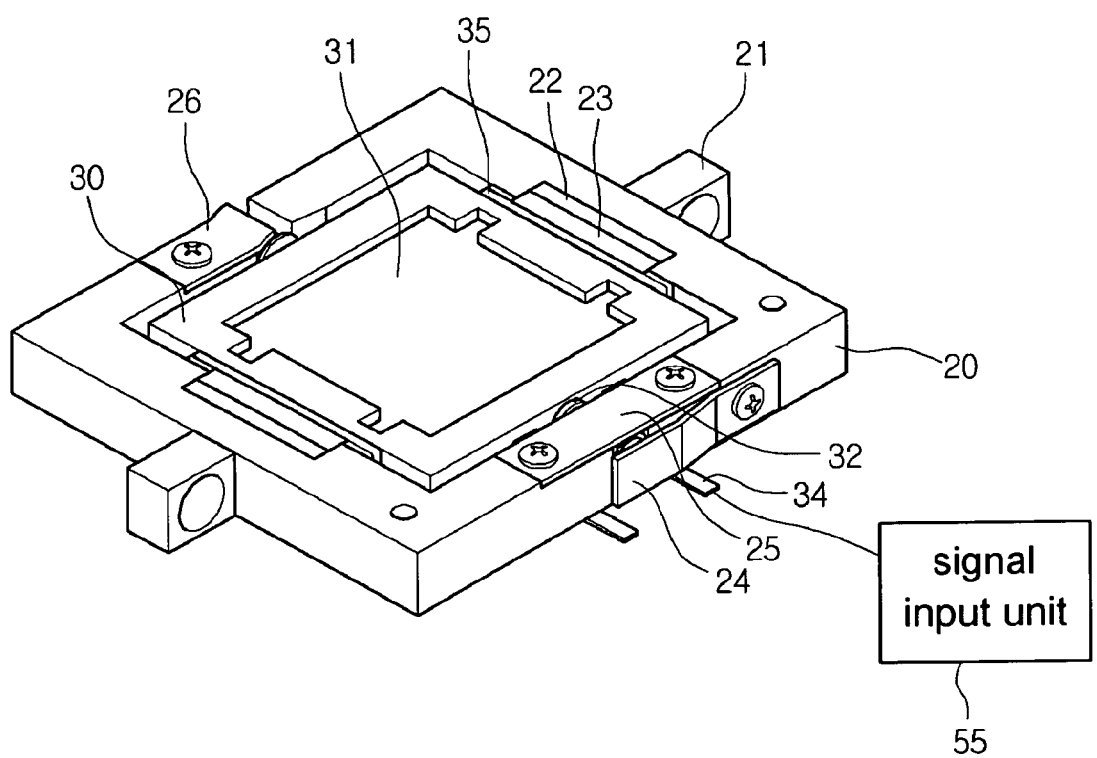
FIG. 8 is a perspective view of a resolution improvement device in accordance with the present invention.
Figure 9:
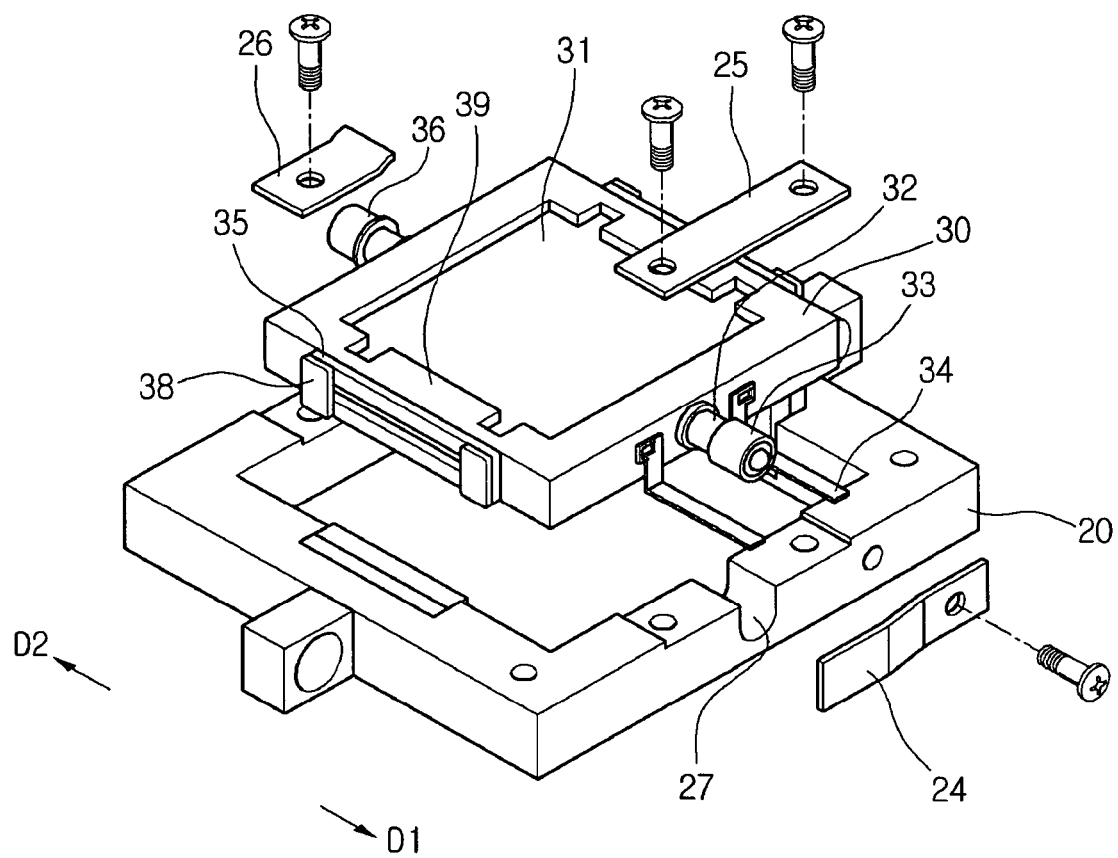
FIG. 9 is a disassembled perspective view of a resolution improving device in accordance with the present invention.

FIG. 8 is a perspective view of a resolution improvement device in accordance with the present invention, and FIG. 9 is a disassembled perspective view of a resolution improvement device in accordance with the present invention.

Figure 10:
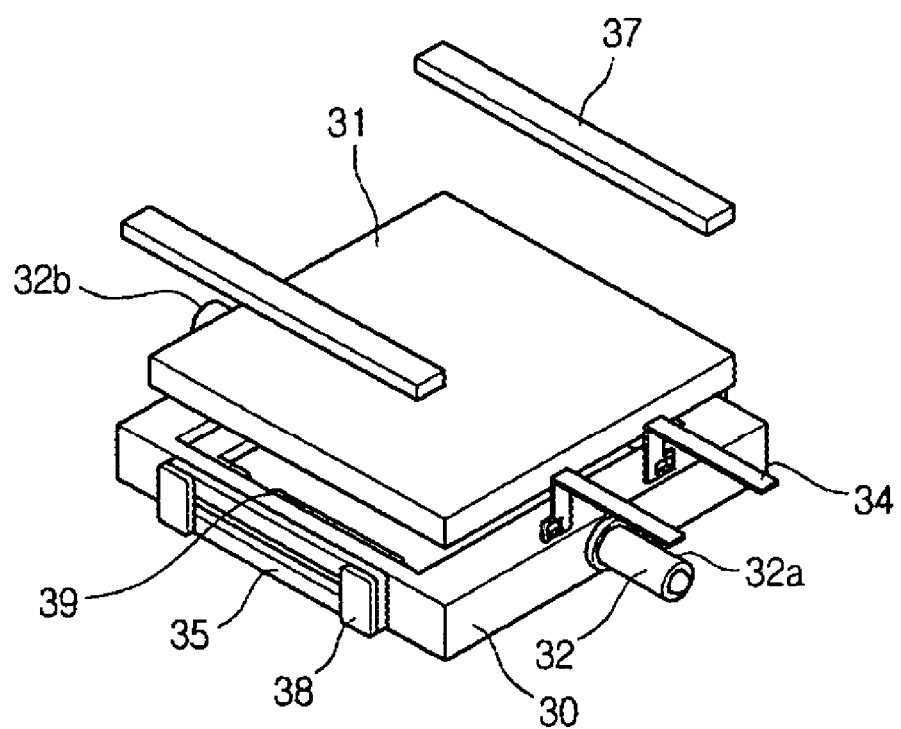
FIG. 10 is a rear-sided disassembled perspective view of a movable member.
Figure 11:
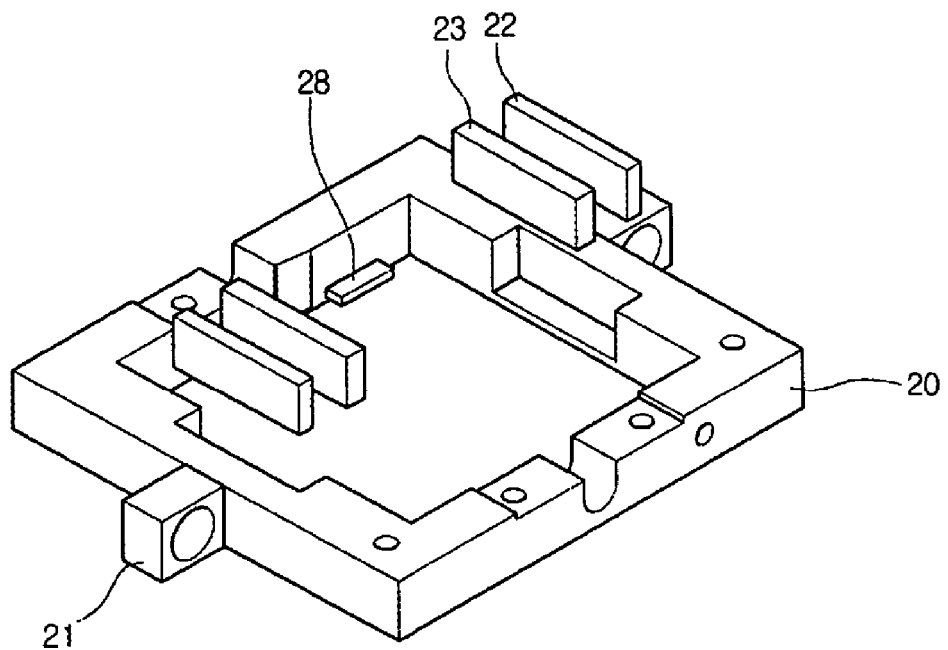
FIG. 11 is a disassembled perspective view of a fixed member.

In addition, FIG. 10 is a disassembled perspective view of a rear surface of a movable member, and FIG. 11 is a disassembled perspective view of a fixed member.

Referring to FIGS. 8 to 11, the resolution improvement device in accordance with the present invention includes a fixed member 20 and a movable member 30.

First, the fixing member 20 is located on an optical pathway between an image forming means and a screen to have a fixing unit 21 be fixed at a side. In Figs., a hole is formed for a screw coupling, but a method for fixing in a display device can be modified in various ways.

In other words, the fixing member 20 can firmly fix a resolution improvement device on an optical pathway.

In addition, a magnet 23 and a yoke 22 can be formed at a side of the fixing member 20. Preferably, the magnet 23 and the yoke 22 can be formed at both sides or at a side of the fixing member 22 as shown in Figs.

Here, the magnet 23 may be a two-pole magnet with an N-pole and an S-pole, or an one-pole magnet with a selectively chosen N-pole or S-pole, or a plurality of pole magnets with a plurality of N-poles and S-poles.

The magnet 23 can have a movable member 30 be driven using magnetic fields, and the yoke 22 forms a pathway of magnetic fields to increase an efficiency of magnetic fields.

In the meantime, the movable member 30 is connected to rotate at an inner side of the fixing member 20.

The movable member 30 is formed to have a quadrangle or a rhombus in a structure surrounding an optical pathway. In addition, the movable member 30 is formed in a structure appropriate for fixing the displacement plate 31.

As described above, the displacement plate 31, as a light transmitting body, rotates periodically at a predetermined angle for a short time to displace the positions where an image is shed on a screen.

To obtain the above, the displacement plate 31 may be perpendicular to or have some degrees of an angle to an optical pathway. Therefore, an incidence angle of a light impinged on the displacement plate 31 is periodically changed.

The movable member 30 has a shaft 32 at both sides to be connected to rotate at the shaft insertion hole 27 of the fixing member 20, and preferably further include the first and the second bearings 33 and 36 for smooth rotation. Here, the shaft 32 plays a role as a rotational central axis, which is formed to be perpendicular to the optical pathway, of the movable member 30 or the displacement plate 31.

The first bearing 33 has a shaft 32 inserted in the center of its cylindrical shape, and is located at the shaft insertion groove 27 of the fixing member 20.

The second bearing 36 has a larger external circumference than the internal circumference of the movable member 30 to be engaged with the internal surface 20 of the fixing member 20.

In other words, the movable member 30 is fixed not to move in a left direction by the second bearing 36 at the state that the fixing member 20 is inserted, and not to move in a right direction because a plate spring 24 is formed at the first bearing 33 of the right side.

The movable member 30 is fixed to smoothly rotate so that a suitable movement is guaranteed by an elastic force of the plate spring 24.

The plate spring 24 supports the movable member 30 of which one end is connected to the fixing member 20 and the other end is not fixed.

In the meantime, the first cover 25 and the second cover 26 are formed on the first bearing 33 and the second bearing 36 to support so that the movable member 30 is not come out upwardly.

The first cover 25 is connected with the movable member 30 by two screws and the second cover 26 is partially connected with the movable member 30 with one screw. The formation reason as above is to guarantee movements suitable for a smooth rotation of the movable member 30.

In other words, the second cover 26 has an appropriate elastic force, similar to an operation of the plate spring 24.

A suitable movement is guaranteed in the movable member 30 to play a role as an elastic force to be fixed to the fixing member 20.

In the meantime, a coil 35 is formed on a lateral surface of the movable member 30 or a surface facing the magnet 23 formed on the fixing member 20.

Figure 12:
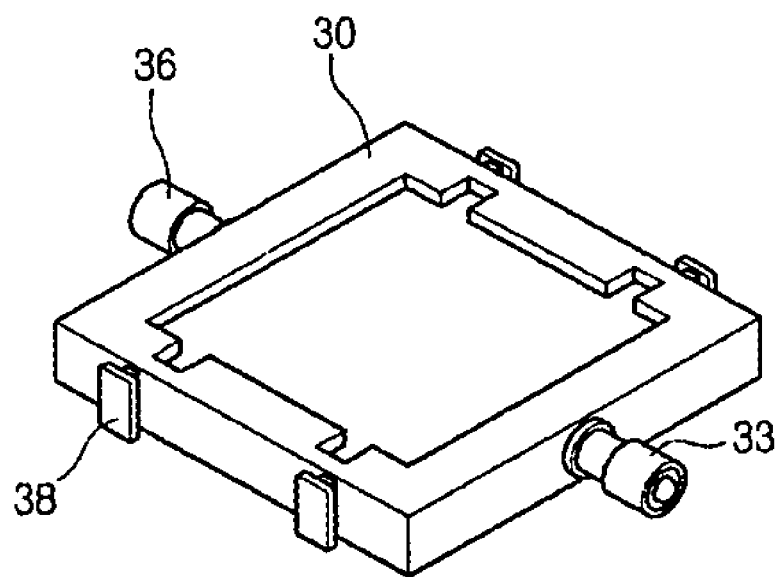
FIG. 12 is a view illustrating a coil holder formed on a movable member.

In other words, as shown in FIG. 12, in order to easily institute the coil 35, a coil holder 38 on which a coil is fixedly supported is equipped on a lateral surface of the movable member 30. The coil 35 is approximately formed in a rectangle or a race track so that the movable member 30 is moved along with the current around the magnet 23.

More specifically, the coil 35 is connected with a signal input line 34 to and is applied with an input signal from the signal input unit 55. As the coil 35 is applied with an input signal, an attractive force and a repulsive force are generated by an interaction with a magnet formed on the fixing member to make the movable member 30 driven. In other words, in accordance with an input signal applied to the coil 35, the movable member 30 rotates clockwise or counterclockwise around a rotational central axis.

Even if not illustrated in Figs., a magnet is formed at a lateral surface of the movable member, and a coil holder and a coil supported by the coil holder may be formed at a lateral surface of a fixing member facing the magnet.

As shown in FIG. 10, the displacement plate 31 is connected with the movable member 30 to position the displacement plate 31 on the protruding unit 39 formed at an inner side of the movable member 30 to be fixed using the supporting member 37. A shape of the protruding unit 39 is illustrated in detail in FIG. 9.

The displacement plate 31 is radiated along with the movable member 30 to fix to the movable member 30 without any supporting members 37.

Furthermore, as shown in FIG. 11, in order to limit a rotating angle of the movable member 30, a stopper 28 is formed at an internal side of the fixing member 20 to limit a rotating range of the movable member 30 less than a regular angle due to an external impact, a malfunction or an excessive operation.

The resolution improvement device configured as above according to the present invention is located on an optical pathway of a display device rotates by an interaction of a coil 35 with a magnet 23 in accordance with an appliance of an input signal.

Preferably, the movable member 30 is set to rotate in a range of −0.75~0.75 and rotates to be positioned periodically at the first position and the second position.

If a thickness of a displacement plate is set to be thick, the movable member 30 may rotate in a range of −0.41~0.41.

In a case that a rotating range of the movable member 30 is larger than ±0.75, there occur problems that a noise is increased and a high voltage is required.

The movable member 30 rotates at least once while an image signal of one frame is applied.

Accordingly, it is possible to remarkably improve a visually perceived resolution.

Figure 13:
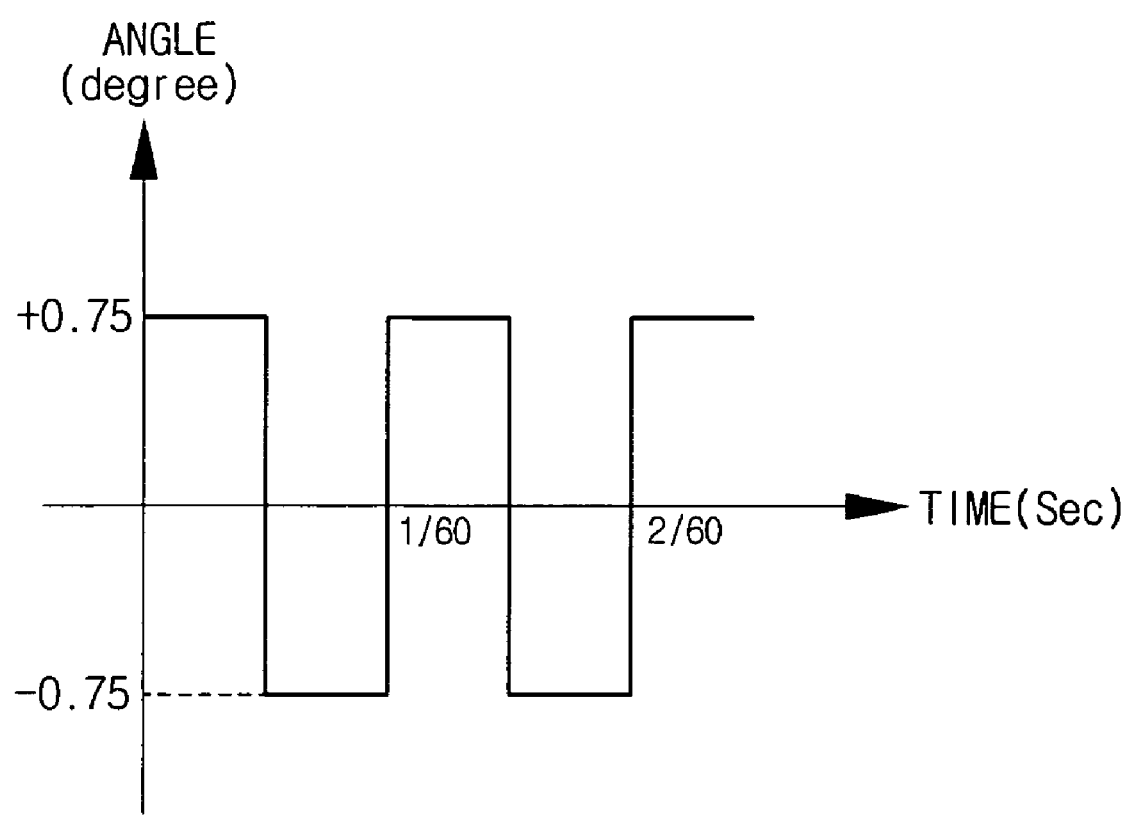
FIG. 13 is a view illustrating a preferred embodiment of a driving waveform where a movable member rotates in a resolution improvement device in accordance with the present invention.

FIG. 13 is an embodiment illustrating an ideal example of a driving waveform where a movable member rotates in a resolution improvement device in a display method in accordance with the present invention.

As shown in FIG. 13, the movable member 30 rotates by a control signal having at least one period while the same image signal is displayed.

Preferably, the movable member 30 may be set to rotate at a regular angle for a period of 1/60 seconds.

If an image of one frame is displayed for 1/60 seconds, and a movable member of a resolution improvement device rotates for a period of 1/60 seconds, the same image is displayed at different positions (the first position and the second position) on a screen to be perceived like a visible resolution is improved.

Especially, as shown in FIG. 13, it is preferable to control that a movable member rotates in a square wave at a high speed.

Figure 14:
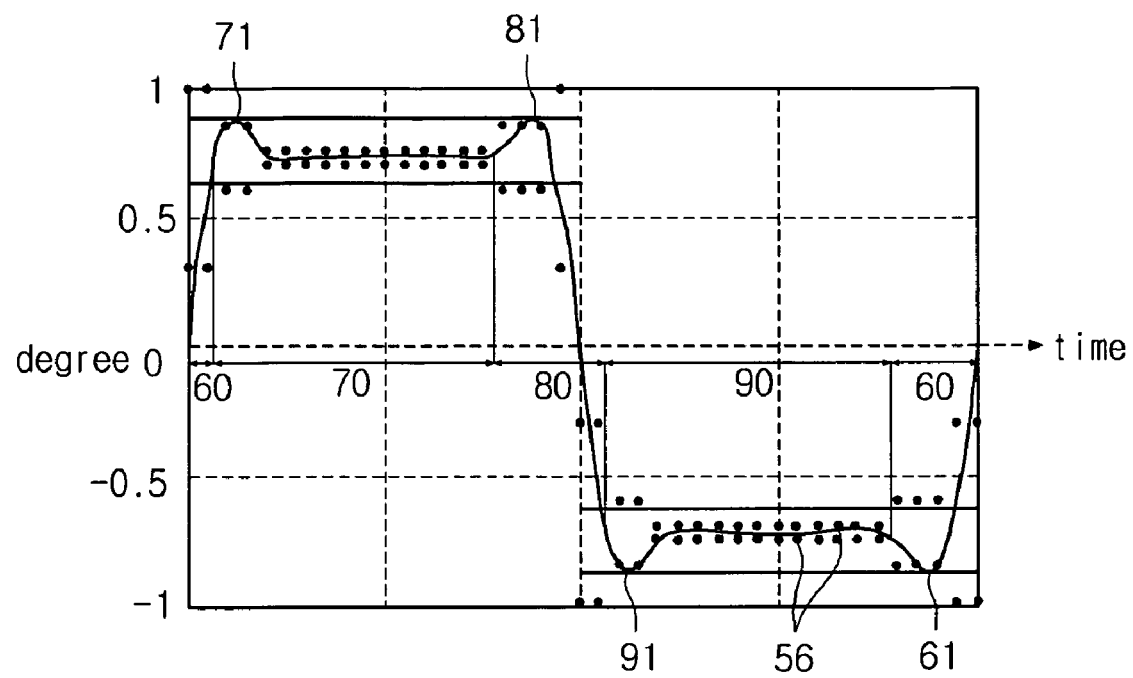
FIG. 14 is a view illustrating a driving waveform where a movable member rotates in a resolution improvement device in accordance with the present invention.

In the meantime, FIG. 14 shows a preferred embodiment of a driving waveform where a driving member rotates in a resolution improvement device in a display device according to the present invention.

FIG. 14 shows a driving waveform corresponding to one period.

The driving waveform shown in FIG. 14 consists of an interval 60 at which the movable member 30 rotates in the first direction, an interval 70 at which the movable member directed in the first direction is stabilized to stop, an interval 80 at which the movable member 30 rotates in the second direction and an interval 90 at which the movable member 30 rotated in the second direction is stabilized to stop.

An overshoot 71 at the interval 70 in the driving waveform is to rotate the movable member 30 rapidly in the first direction by an interaction of the magnet 35 and the coil 23 and to stop the movable member 30 at an exact position.

In addition, the overshoot 81 at the interval 80 in the driving waveform is to rotate the movable member 30 rapidly in the second direction by a strong torque due to an interaction of the magnet 35 and the coil 23.

Like this, an overshoot 91 at the interval 90 in the driving waveform is to rotate the movable member 30 rapidly in the second direction by an interaction of the magnet 35 and the coil 23 and to stop the movable member 30 at an exact position.

In addition, the overshoot 61 at the interval 60 in the driving waveform is to rotate the movable member 30 rapidly in the first direction by a strong torque due to an interaction of the magnet 35 and the coil 23.

In the meantime, an input waveform for generating the preferred driving waveform as above endows the driving waveform with a plurality of constraints 56, and passes a process for calculating an input waveform satisfying the constraint 56 in reverse.

In calculating an input waveform, it should be considered that a torque generated by a magnet 35 and a coil 23 and an amount that the movable member 30 really rotates by the torque.

Figure 15:
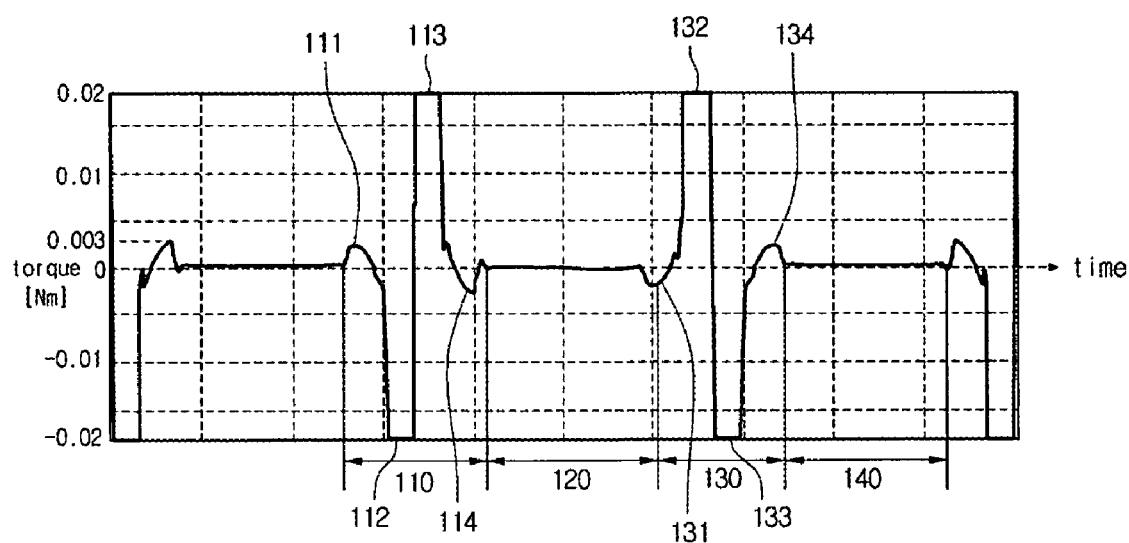
FIGS. 15 & 16 are views illustrating an input signal so that a movable member of a resolution improvement device is driven in the present invention.

FIG. 15 shows a preferred embodiment of an input waveform for driving the movable member, wherein the input waveform is shown in a unit of torque.

The input waveform consists of a first directional rotation interval 110 at which the movable member 30 rotates in the first direction from the state that it stops, a first stop interval 120 at which the movable member 30 rotates in the first direction and it stops, a second directional rotation interval 130 at which the movable member 30 rotates in the first direction and rotates in the second direction from the state that it stops, and the second stop interval 30 at which the moving unit 30 rotates in the second direction and it stops.

If an input waveform is applied, the moving member 30 rotates in the first direction and stops and then it rotates in the second direction and stops. The above operations are repeatedly performed.

When the first directional rotating interval 110 is viewed from the input wave, a second directional sub-input 111 for rotating the movable member 30 in the first direction to be stopped, a first directional main input 112, a second directional main input 113 and a first directional main input 114 are included to be applied.

The second directional sub-input 111 is to maximize a torque due to an interaction of a magnet 35 and a coil 23 in the movable member 30, and the first directional main input 112 is to really rotate the movable member 30 in the first direction.

In addition, the second directional main input 113 is to stop the movable member 30 rotating in the first direction, and the first directional sub-input 114 is to stop the movable member 30 at an exact position by offsetting a torque of the second directional main input 113.

Like this, when the second directional rotation interval 130 is viewed from the input waveform, a first directional sub-input 131 for rotating the movable member 30 in the second direction to be stopped, a second directional main input 132, a first directional main input 133 and a second directional sub-input 134 are included to be applied.

The first directional sub-input 131 is to maximize a torque due to an interaction of a magnet 35 and a coil 23 in the movable member 30, and the second directional main input 132 is to really rotate the movable member 30 in the second direction.

In addition, the first directional main input 133 is to stop the movable member 30 rotating in the second direction, and the second directional sub-input 134 is to stop the movable member 30 at an exact position by offsetting a torque of the first directional main input 133.

In an illustrated embodiment, a torque of 0.02 Nm is applied in the main inputs 112, 113, 132 and 133 and a torque of 0.003 Nm is applied in the sub-inputs 111, 141, 131 and 134.

It is preferable that the size of the sub-inputs 111, 114, 131 and 134 is 40% less than the main inputs 112, 113, 132 and 133.

The above input waveform is applied to a coil 35 of a movable member 30 via a signal input unit 55 shown in FIG. 8 to make the driving member 30 driven.

Figure 16:
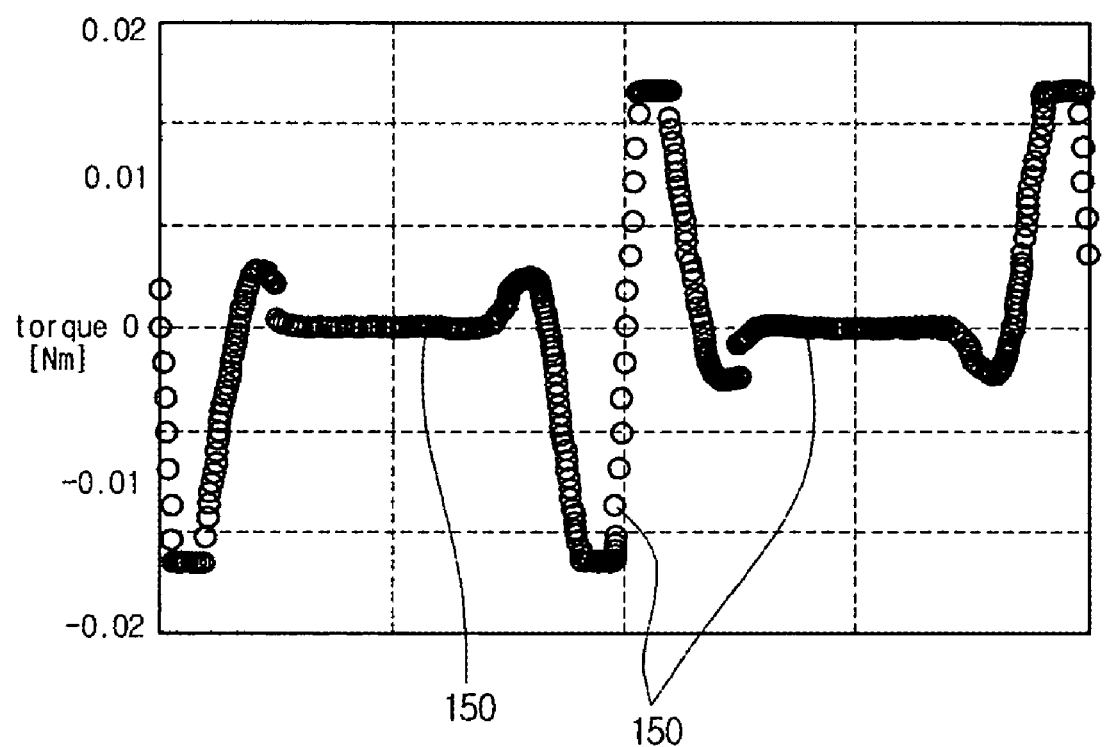
Figure 17:
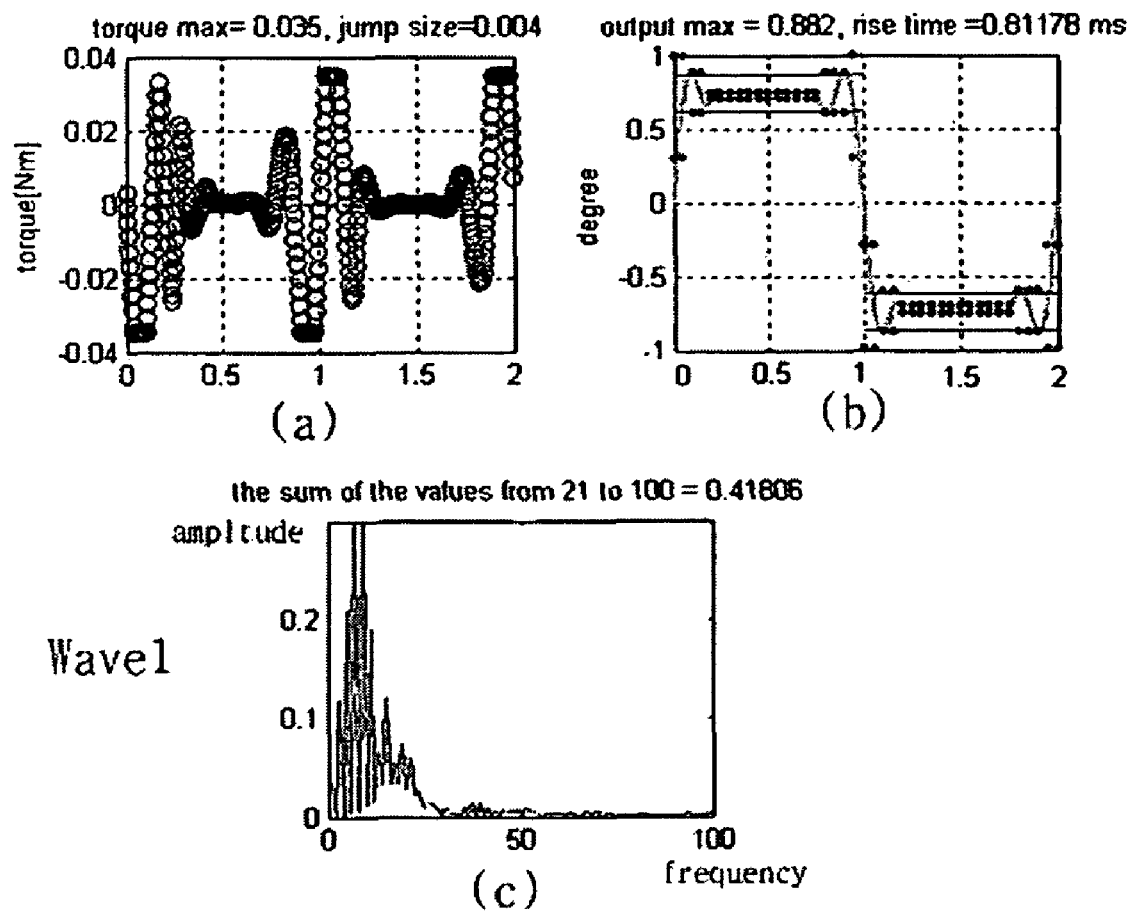
FIGS. 17-28 are views illustrating various waveforms in accordance with the present invention.
Figure 18:
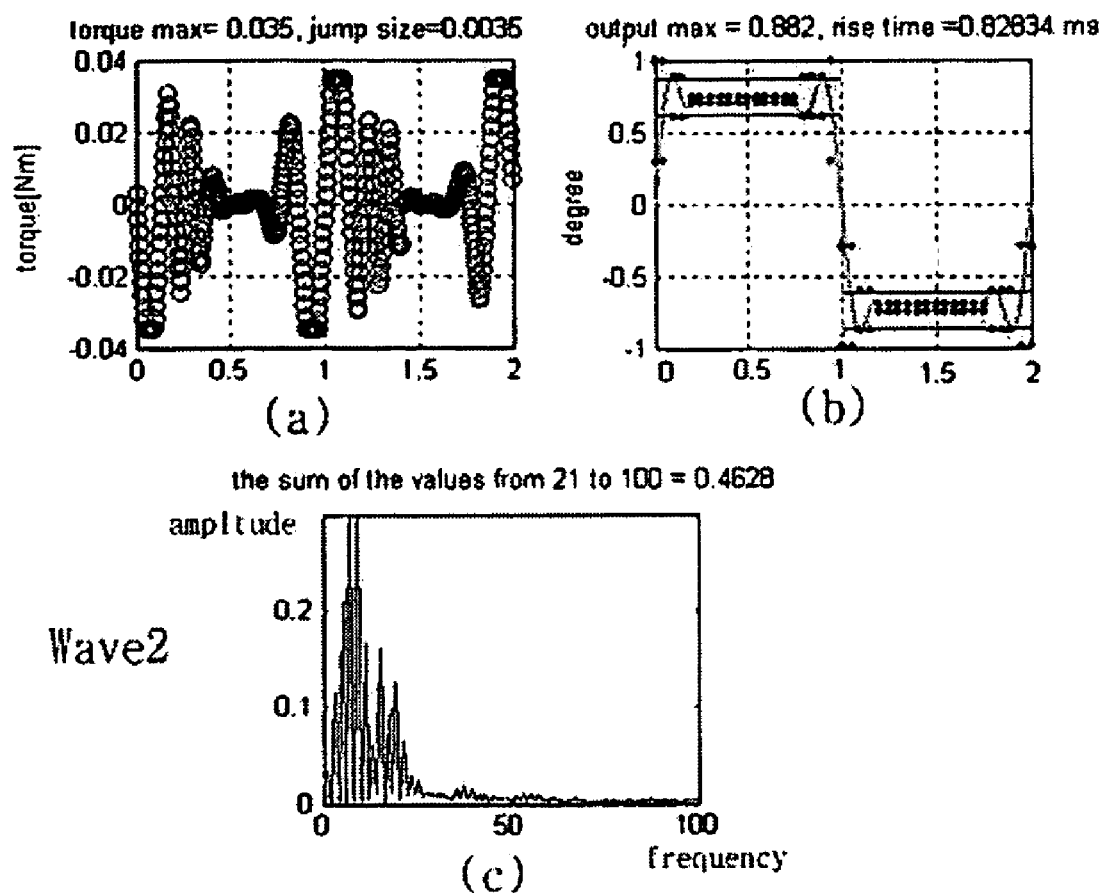
Figure 19:
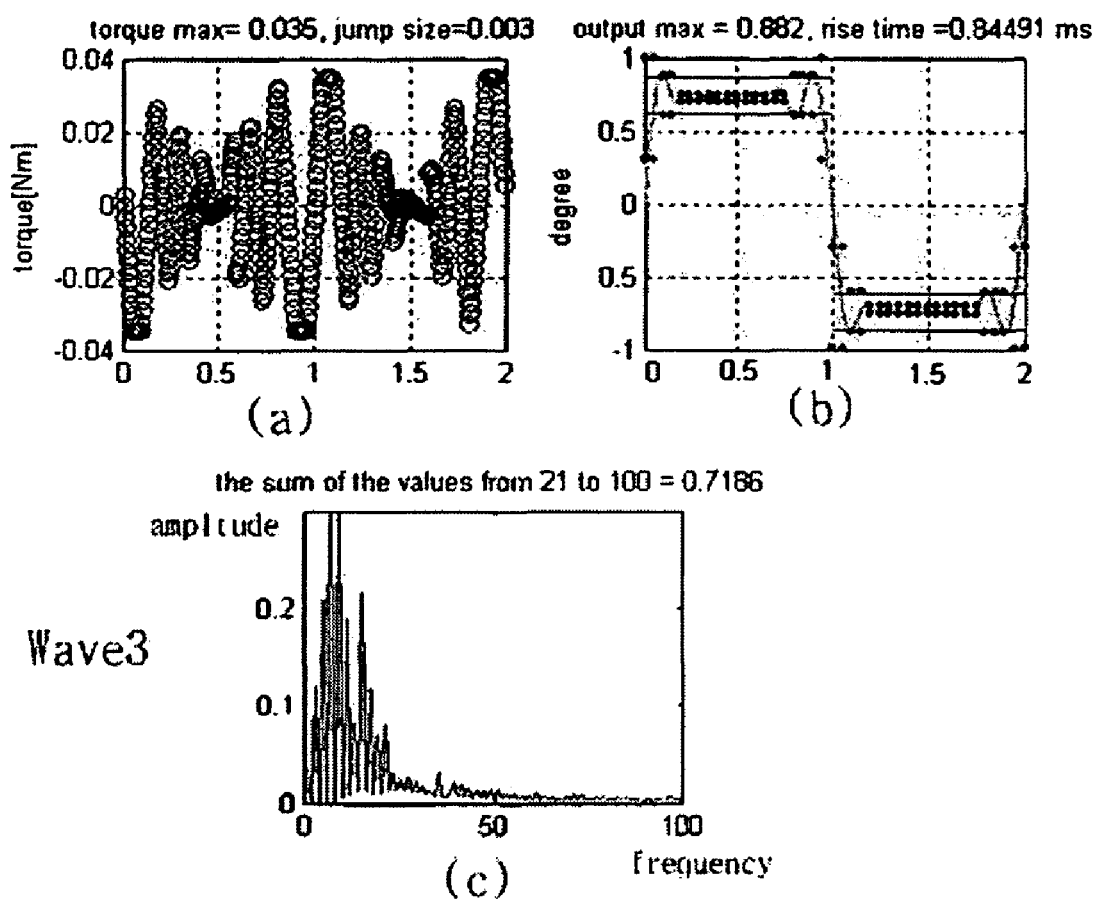
Figure 20:
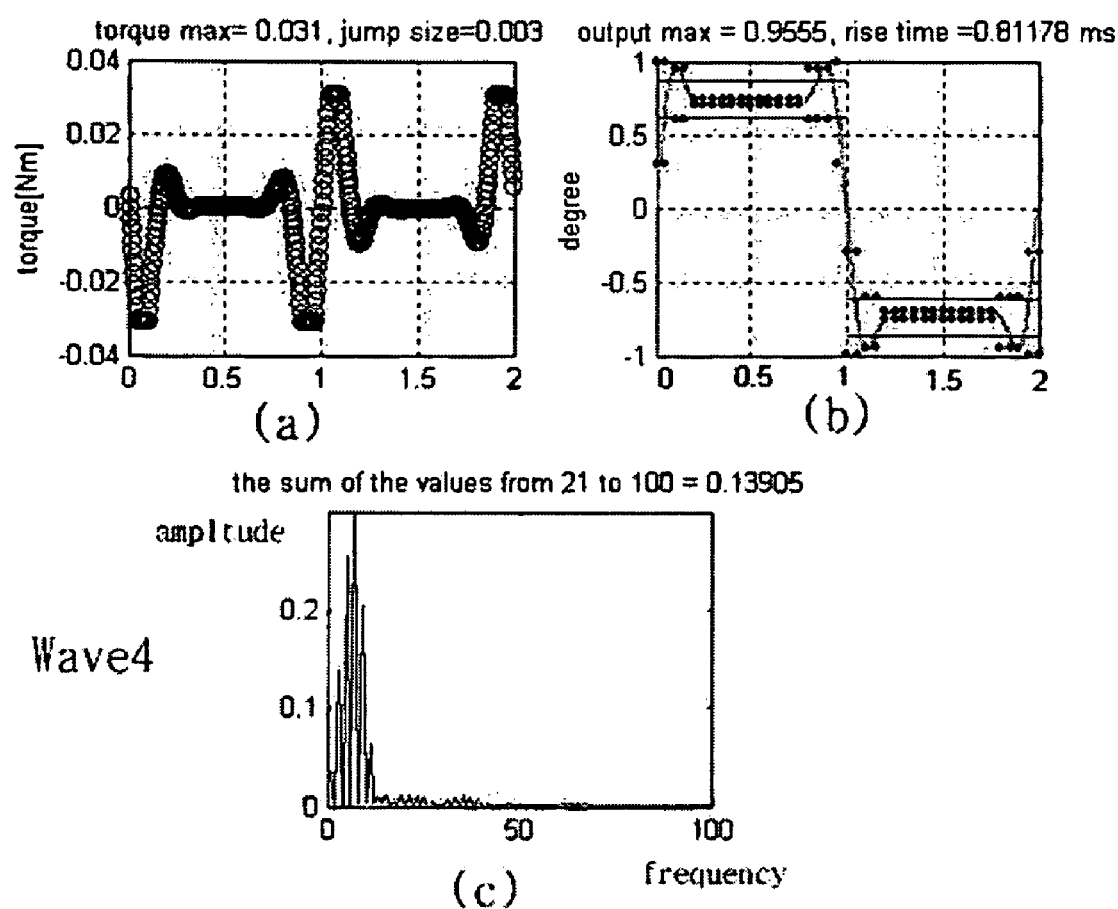
Figure 21:
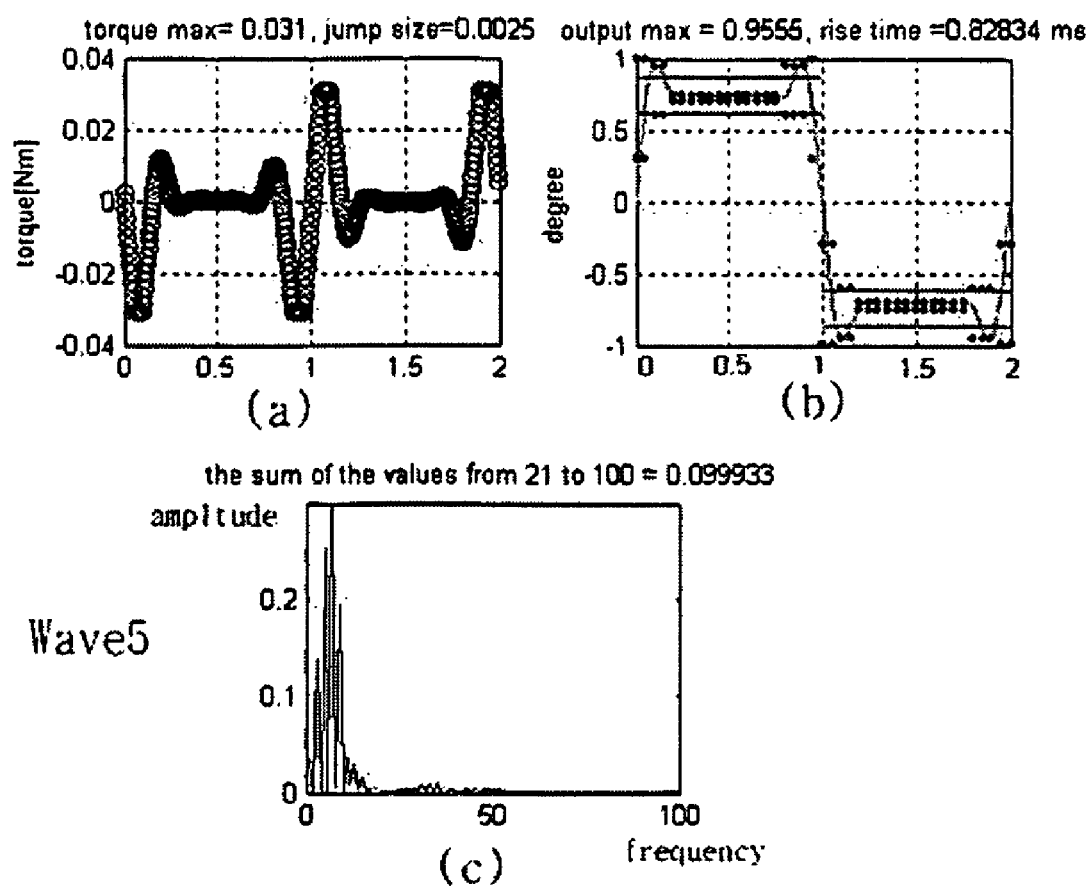
Figure 22:
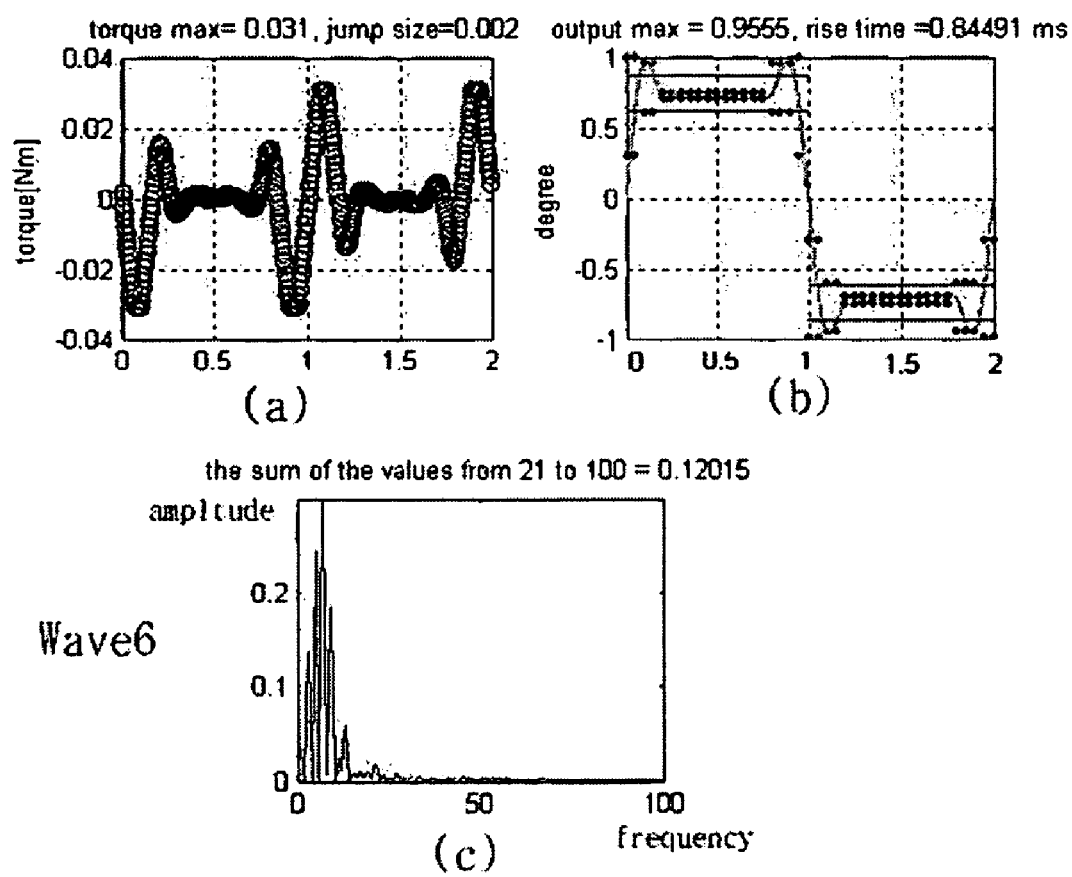
Figure 23:
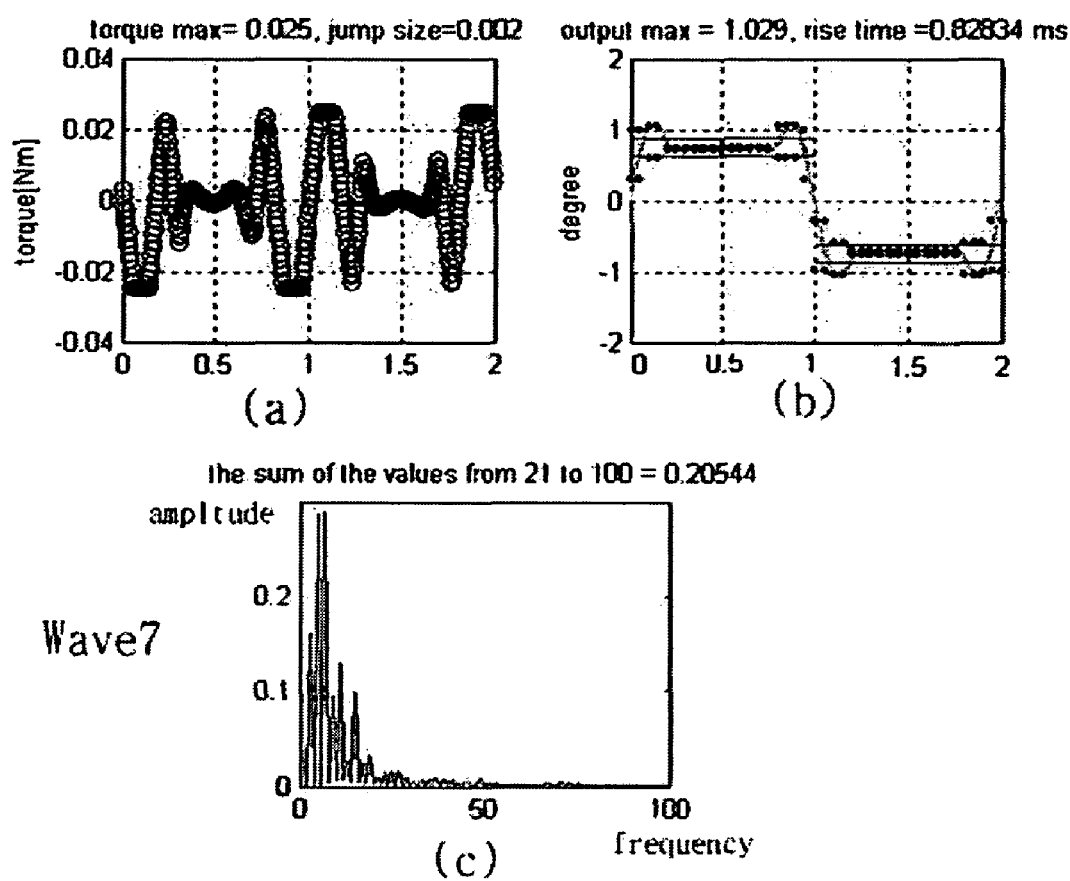
Figure 24:
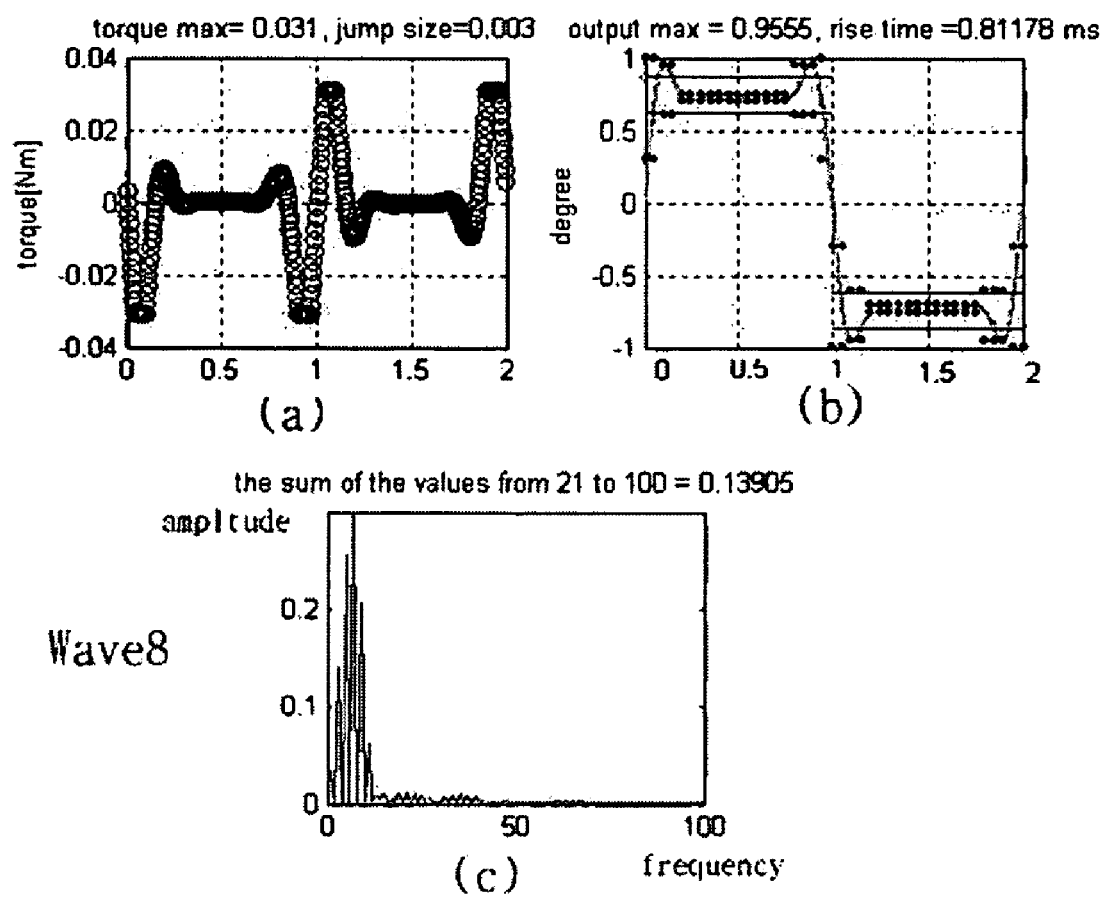
Figure 25:
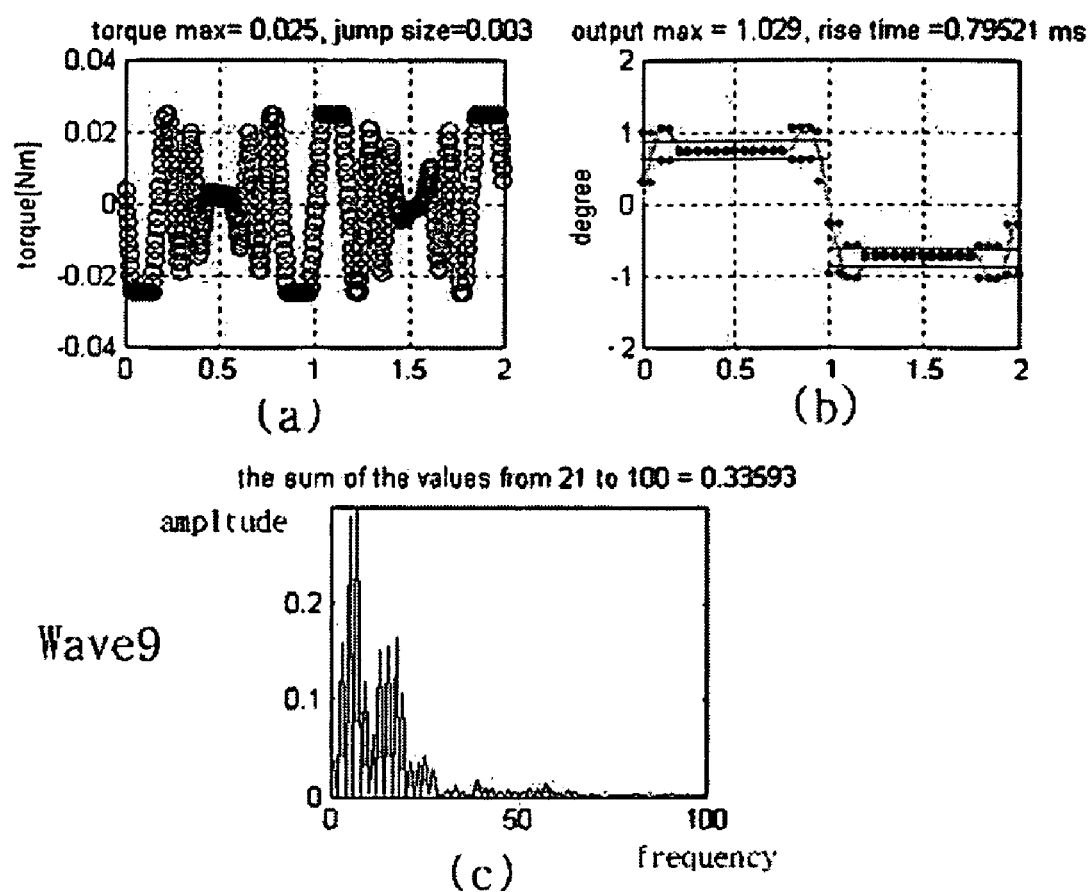
Figure 26:
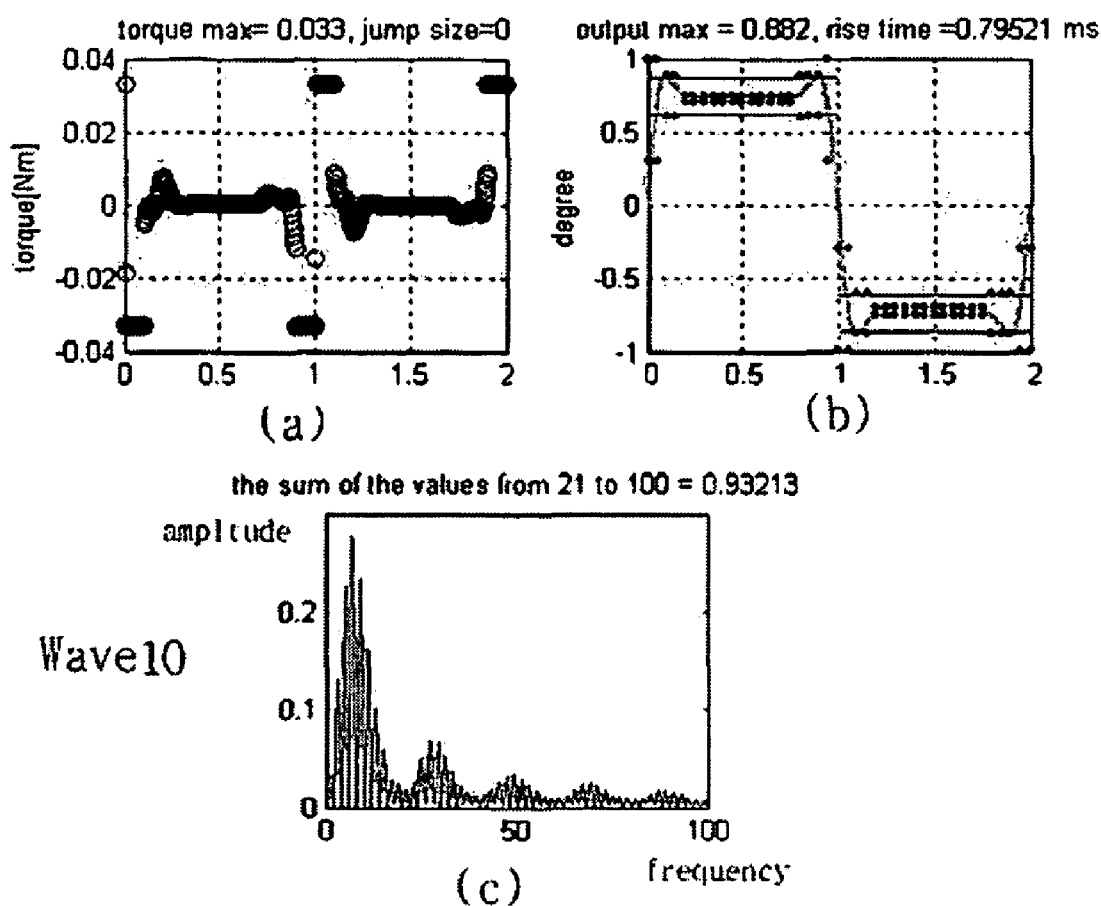
Figure 27:
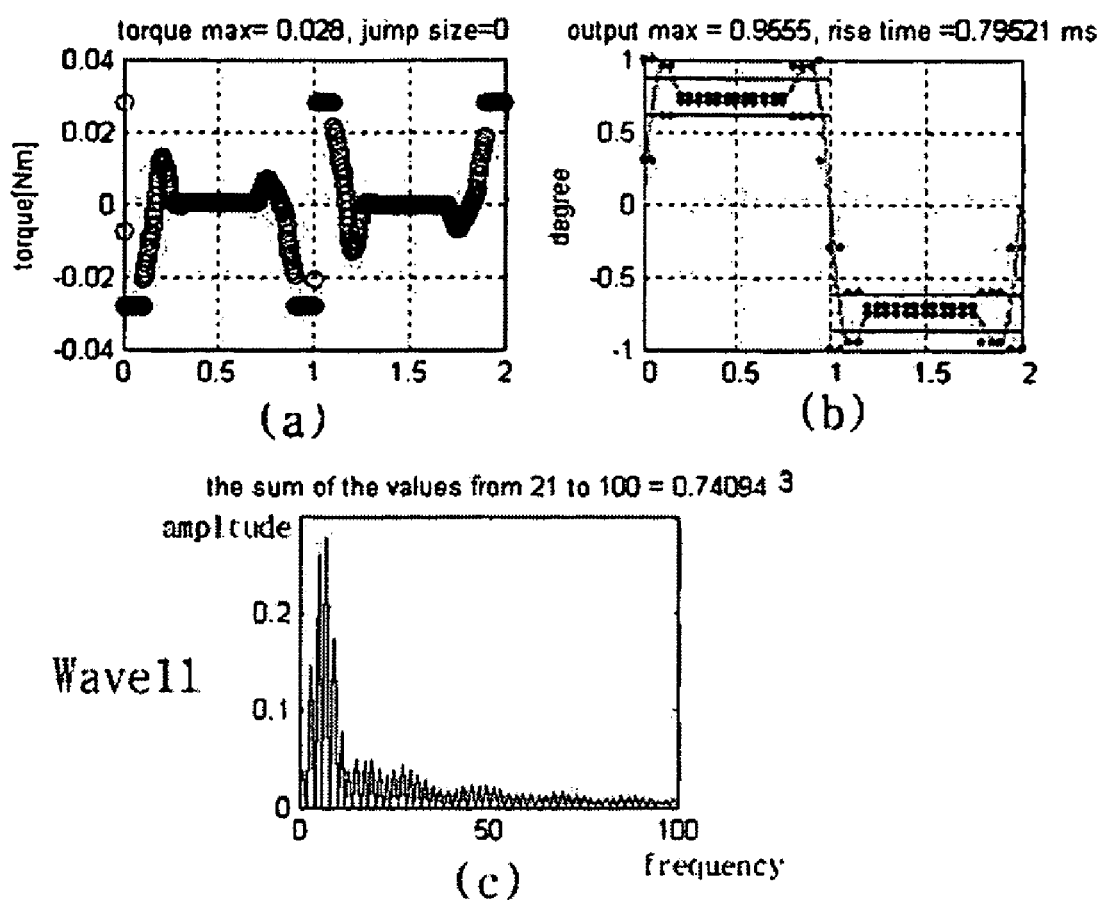
Figure 28:
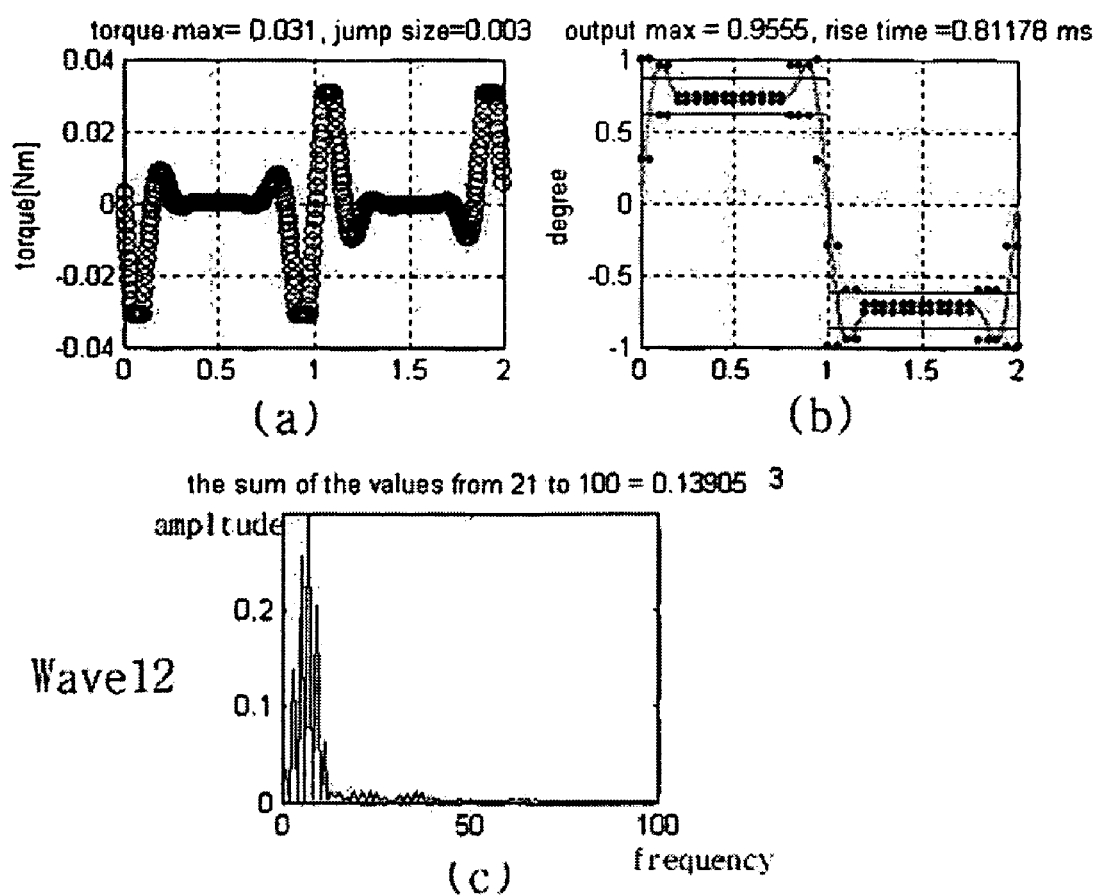

In FIG. 16, an input signal is illustrated in a unit of a torque in a preferred embodiment of an applied input signal in order to drive a movable member.

The input signal 150 applied to a movable member has 256 sample values for half cycle where a movable member is driven as an 8-bit digital value generated via a digital board. Some of 256 sample values can be used for controls, and 250-255 sample values are used for driving a movable member for half cycle where the movable member is driven.

An input signal 150 applied to the movable member can occasionally use a digital value generated via a 4-bit digital board. In this case, 16 sample values may be used.

The input signal 150 is applied in an analog type via a digital-analog transformer.

The input signal 150 applied with a digital value can turn the movable member 30 rapidly in the first direction and the second direction and stop it at an exact position.

Accordingly, a resolution improvement device according to the present invention driven in a driving waveform illustrated in FIG. 14 displays an image displayed on a screen at the first position and the second position in turns to effectively improve a resolution.

FIGS. 17 to 28 show a driving waveform and frequency components in accordance with various input waveforms which can be modified in the present invention.

All the figures have (a) a view illustrating an input waveform, (b) a view illustrating a driving waveform and (c) a view illustrating frequency components.

FIGS. 17 to 28 correspond to waves 1 to 12 in the table as below.

TABLE 1

| wave | rising time (ms) | Over shoot (%) | jump length | domain | torque (Nm) | sum_of_hf | voltage (V) | driving angle (degree) | noise (dB) |
|---|---|---|---|---|---|---|---|---|---|
| Wave1 | 0.8118 | 20 | 0.0040 | 4.900 | 0.035 | 0.418 | 17.2 | 0.95 | 33.9 |
| Wave2 | 0.8283 | 20 | 0.0035 | 4.900 | 0.035 | 0.463 | 18.6 | 0.95 | 31.3 |
| Wave3 | 0.8449 | 20 | 0.0030 | 4.900 | 0.035 | 0.719 | 18.6 | 0.95 | 34.8 |
| Wave4 | 0.8118 | 30 | 0.0030 | 4.900 | 0.031 | 0.139 | 17 | 1.11 | 27.8 |
| Wave5 | 0.8283 | 30 | 0.0025 | 4.900 | 0.031 | 0.100 | 17 | 1.07 | 26.8 |
| Wave6 | 0.8449 | 30 | 0.0020 | 4.500 | 0.031 | 0.120 | 16.8 | 1.07 | 24.7 |
| Wave7 | 0.8283 | 40 | 0.0020 | 4.000 | 0.025 | 0.205 | 13.6 | 1.07 | 25.8 |
| Wave8 | 0.8118 | 40 | 0.0025 | 4.000 | 0.025 | 0.282 | 13.4 | 1.07 | 27.9 |
| Wave9 | 0.7952 | 40 | 0.0030 | 4.000 | 0.025 | 0.336 | 14.2 | 1.15 | 29.8 |
| Wave10 | 0.7952 | 20 | 0.0000 | 0.000 | 0.033 | 0.932 | 16 | 1.07 | 39.1 |
| Wave11 | 0.7952 | 30 | 0.0000 | 0.000 | 0.028 | 0.741 | 14.2 | 1.07 | 36.8 |
| Wave12 | 0.8118 | 40 | 0.0000 | 0.000 | 0.023 | 0.913 | 12 | 1.07 | 38.6 |

In the present invention, a rising time in a driving waveform is limited to 0.5~1.2 ms. A rising time is set to 0.8 mm in the table 1 for reference.

A rising time refers to a time in which a movable time 30 rotates from the first direction to the second direction, in this case, a Video Blanking Interval VBI of a displayed image is considered.

In other words, the movable member 30 rotates from the first direction to the second direction to displace an image during an interval between after the first image is displayed before the second image is displayed, therefore a resolution improvement device can be operated.

If a rising time is less than 0.5 ms, a strong torque is required and a high voltage should be applied. In this case, a noise is increased a lot in accordance with rotations of a movable member 30.

If a rising time is larger than 1.2 ms, the movable member 30 does not complete rotations of the movable member 30 for VBI of a displayed image, therefore a purpose for improving a resolution cannot be obtained.

Accordingly, it is preferable that a rising time in a driving waveform is set to 0.5~1.2 ms.

In addition, an overshoot in a driving waveform is limited in a range of 10~40%.

If an overshoot is less than 10%, a torque larger than 0.040 Nm is required and noises due to high frequencies are greatly generated.

If an overshoot is larger than 40%, it lasts for a long time before the movable member 40 rotating in the first direction and the second direction stops. In this case, the displacement of an image can occur at the state that the movable member 30 stops and a degree of resolution improvements is decreased.

Accordingly, it is preferable that an overshoot in a driving waveform is in a range of 10~40%.

The items 'jump length' and 'domain' in the table 1 represent a factor value decreasing high frequencies components for decreasing noises. In the case of Wave10, Wave11 and Wave12, the items of 'jump length' and 'domain' are set to '0', it is confirmed that high frequencies and noises are increased. In the table 1, the item of 'sum of hf' refers to a sum of high frequencies components larger than 20 kHz.

In the meantime, as shown in FIGS. 17 to 28, the present invention does not have a time delay between an input waveform and a driving waveform.

In other words, the preferred embodiment of the present invention have been described, but it is apparent that those skilled in the art can modify and change the present invention within a spirit and scope of the present invention claimed in the claims as follows.

According to the present invention, different images are displayed on a screen periodically. It seems that the greater number of pixels is used than the real number in a sense of sight. Thus, the present invention has an effect of improving a resolution with the same number of pixels.

Therefore, the present invention can effectively improve a resolution with a low cost in a large-screened display device.

What is claimed is:

1. A display device comprising:
   a light source;
   an image forming means for forming an image using a light emitted from the light source and an input image signal;
   a projecting means for projecting an image formed in the image forming means on a screen;
   a displacement means for displacing an image displayed on the screen to be displaced;
   a driving means for driving the displacement to be moved; and
   an input signal applying means for applying an input signal to the driving means so that the displacement means rotates in a predetermined direction,
   wherein the input-signal applying means has a driving waveform including an interval where the displacement means rotates in the first direction, an interval where the displacement means rotated in the first direction is stabilized to be stopped, an interval where the displacement means rotates in the second direction, and an interval where the displacement means rotated in the second direction is stabilized to be stopped.

2. The displace device of claim 1, wherein the image forming means divides an image signal corresponding to one frame into more than two image signals.

3. The display device of claim 1, wherein the displacement means is a displacement plate with a central axis, rotating in a range of a predetermined angle.

4. The display device of claim 3, wherein the displacement plate rotates around the central axis clockwise and counterclockwise.

5. The display device of claim 4, wherein the rotating range is between −0.75 and 0.75 degrees.

6. The display device of claim 3, wherein the displacement plate forms a difference (D) of an optical pathway by the following formula:

$$D = \frac{T}{\cos\theta_2}\sin(\theta_1 - \theta_2)$$

(here, $\theta_1$ is an incidence angle, $\theta_2$ is a refractive angle and T is a thickness of a displacement plate).

7. The display device of claim 3, wherein a refractive index of the displacement plate is in a range of 1.4~2.0.

8. The display device of claim 1, wherein the displacement means forms more than two displacements while a screen of one frame is transmitted.

9. The display device of claim 1, wherein the driving means drives the displacement means by an interaction of a magnet and a coil.

10. The display device of claim 9, wherein the magnet is a two-pole magnet with an N-pole and an S-pole.

11. The display device of claim 9, wherein the magnet is a one-pole magnet with a selectively chosen N-pole or S-pole.

12. The display device of claim 1, wherein the input signal applying means is driven by repeating a process that the displacement means rotates in the first direction to be stopped and a process that the displacement means rotates in the second direction to be stopped.

13. The display device of claim 1, wherein the input signal comprises: a second-directional sub-input for rotating the displacement means in the first direction and providing a rotating force in the second direction to stop it, a first-directional main input for providing a rotating force in the first direction, a second-directional main input for providing a rotating force in the second direction and a first-directional sub-input for providing a rotating force in the first direction.

14. The display device of claim 1, wherein the input signal comprises: a first-directional sub-input for rotating the displacement means in the second direction and providing a rotating force in the first direction to stop it, a second-directional main input for providing a rotating force in the second direction, a first-directional main input for providing a rotating force in the first direction and a second-directional sub-input for providing a rotating force in the second direction.

15. The display device of claim 13, wherein the first-directional sub-input and the second directional sub-input are provided with a rotating force, 40% less than the first-directional main input and the second-directional main input.

16. The display device of claim 1, wherein the input signal has a digital value generated by a digital board, which is applied in an analog type through a digital-analog transformer.

17. The display device of claim 16, wherein the digital board generates 256 digital values during a half-period where the displacement means is driven.

18. The display device of claim 1, wherein the input signal applying means applies an input signal so that the displacement means rotate, satisfying an optimized driving waveform wherein a rising time of the driving waveform is in a range of 0.5-1.2 ms and an overshoot in the driving waveform is in a range of 10-40%.

19. The display device of claim 16, wherein the driving waveform and an input waveform for generating the driving waveform do not raise a time delay.

20. A displaying method comprising:
inputting an image signal having a plurality of frames;
separating an image signal in one frame input sequentially into a plurality of image signals;
sequentially inputting the separated plurality of image signals to form an image signal;
applying an input signal to an image displacement means so that the plurality of sequentially formed images is displaced at a different position of a screen; and
having an interval where the image displacement means rotates in the first direction in accordance with the input signal, an interval where the image displacement means rotated in the first direction is stabilized to be stalled, an interval where the image displacement means rotates in the second direction and an interval where the image displacement means rotated in the second direction is stabilized to be stopped in order to drive the image displacement means to rotate; and
projecting an image having the image displacement means.

21. The displaying method of claim 20, wherein the input signal comprises: a second-directional sub-input for rotating the image displacement means in a first direction and providing a rotating force in the second direction to stop it, a first-directional main input for providing a rotating force in the first direction, a second-directional main input for providing a rotating force in a second-direction and a first-directional sub-input for providing a rotating force in the first direction.

22. The displaying method of claim 20, wherein the input signal comprises: a first-directional sub-input for rotating the image displacement means in the second direction and providing a rotating force in the first direction to stop it, a second-directional main input for providing a rotating force in the second direction, a first-directional main input for providing a rotating force in the first direction and a second-directional sub-input for providing a rotating force in the second direction.

23. The displaying method of claim 20, wherein the input signal has a digital value generated by a digital board.

\* \* \* \* \*